United States Patent
Shveidel et al.

(10) Patent No.: US 12,307,105 B1
(45) Date of Patent: May 20, 2025

(54) STORAGE SPACE ACCOUNTING TECHNIQUES ALLOWING STORAGE OBJECT IDENTIFIER REUSE AND REASSIGNMENT

(71) Applicant: Dell Products L.P., Hopkinton, MA (US)

(72) Inventors: Vladimir Shveidel, Pardes-Hana (IL); Uri Shabi, Tel Mond (IL); Liang Huang, Shanghai (CN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/422,393

(22) Filed: Jan. 25, 2024

(51) Int. Cl.
*G06F 3/06* (2006.01)
(52) U.S. Cl.
CPC .......... *G06F 3/0626* (2013.01); *G06F 3/0652* (2013.01); *G06F 3/0679* (2013.01)
(58) Field of Classification Search
CPC ..... G06F 3/0626; G06F 3/0652; G06F 3/0679
See application file for complete search history.

(56) References Cited

PUBLICATIONS

U.S. Appl. No. 16/260,660, filed Jan. 29, 2019, entitled: System and Method for Aggregating Metadata Changes in a Storage Sytem, Vladimir Shveidel, et al.

*Primary Examiner* — Christopher D Birkhimer
(74) *Attorney, Agent, or Firm* — Muirhead and Saturnelli, LLC

(57) ABSTRACT

In at least one embodiment, processing can include: maintaining a storage object identifier hash table (SOIDHT) that tracks storage object identifiers (IDs) that have been reassigned among storage objects and that have potential outstanding activity associated with storage objects as prior to performing corresponding reassignments; recording, in a user data (UD) log, a UD log entry corresponding to an operation directed to a storage object assigned a storage object ID, wherein the UD log entry includes a first LSN denoting a point in time when the operation is recorded in the UD log; and flushing the UD log. Responsive to determining that the storage object has a corresponding SOIDHT entry, processing can include determining whether the first LSN of the first UD log entry of the operation is less than a second LSN of the corresponding entry of the SOIDHT.

20 Claims, 17 Drawing Sheets

Dropinode SA delta 1010

LI 1010a: unique logical index of MD page including SA statistics for the SOID that maps to the LI (e.g., the SOID can optionally be explicitly stored as a value in field 1010e, or otherwise determined by a mapping function from LI 1010a).

EI 1010b: entry index denoting a particular entry, offset or location in the MD page denoted by LI (e.g., LI maps to an SOID that has been reassigned or reused. LI and EI collectively denote a MD page entry including one or more SA statistics maintained for the SOID that maps to LI).

T 1010c: type is Dropinode SA delta

V 1010d: Reassign LSN (e.g., denoting the point in time prior to which all MD log updates to SA statistics for the SOID denoted by LI and EI (or LI) are dropped, skipped or ignored).

SOID (storage object ID) 1010e: This can be an optional field explicitly storing the SOID that maps to the LI 1010a.

FIG. 10

STORAGE SPACE ACCOUNTING TECHNIQUES ALLOWING STORAGE OBJECT IDENTIFIER REUSE AND REASSIGNMENT

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: maintaining a storage object identifier hash table (SOIDHT) that tracks storage object identifiers (IDs) that have been reassigned among storage objects and that have potential outstanding activity associated with storage objects as prior to performing corresponding reassignments, wherein the SOIDHT is indexed by storage object IDs mapped to corresponding entries each including a storage object ID and a corresponding logical sequence number (LSN) denoting a point in time when the storage object ID was reassigned from one storage object to another storage object; receiving, from a host, a first operation directed to a first storage object assigned a first storage object ID; recording, in a user data (UD) log, a first UD log entry corresponding to the first operation, wherein the first UD log entry includes a first LSN denoting a point in time when the first operation is recorded in the UD log; and flushing the UD log including the first UD log entry, where said flushing includes: querying the SOIDHT to determine whether the first storage object ID has a corresponding first entry included in the SOIDHT; responsive to determining that the first storage object has a corresponding first entry included in the SOIDHT, performing first processing including: determining whether the first LSN of the first UD log entry of the first operation is less than a second LSN of the corresponding first entry of the SOIDHT; and responsive to determining that the first LSN of the first UD log entry of the first operation is less than the second LSN of the corresponding first entry of the SOIDHT, not recording any update in a metadata (MD) log to one or more first space accounting (SA) statistics, and otherwise recording a first set of one or more updates to one or more first SA statistics in the MD log, where each update of the first set is in accordance with storage consumption changes due to the first operation recorded in the first UD log entry.

In at least one embodiment, flushing the UD log can include, responsive to determining that the first storage object does not have a corresponding first entry included in the SOIDHT, recording a second set of one or more updates to one or more first SA statistics in the MD log, where each update of the second set is in accordance with storage consumption changes due to the first operation recorded in the first UD log entry. Processing can include: reassigning the first storage object ID from a second storage object to the first storage object; and responsive to said reassigning, performing second processing including: adding the first corresponding entry to the SOIDHT, wherein the first corresponding entry includes the second LSN denoting a point in time when said reassigning the first storage object ID is performed. The second processing can include recording in the MD log a drop SA delta that indicates to drop or ignore SA accounting updates of the first storage object ID that are recorded in the MD log prior to the drop SA delta, wherein the drop SA delta includes the second LSN denoting a point in time when said reassigning the first storage object ID is performed.

In at least one embodiment, processing can include destaging the MD log including the drop SA delta that indicates to drop or ignore SA accounting updates of the first storage object ID and that includes the second LSN denoting a point in time when said reassigning the first storage object ID is performed. Destaging the MD log can include dropping or skipping a first portion of updates to SA statistics that are related to the first storage object ID and that are ingested or recorded in the MD log prior to the drop SA delta. The first portion of updates to SA statistics can be associated with the second storage object previously assigned to the first storage object ID but not currently assigned to the first storage object ID. Deestaging the MD log can include applying a second portion of updates to SA statistics that are related to the first storage object ID and that are ingested or recorded in the MD log after the drop SA delta. The second portion of updates to SA statistics can be associated with the first storage object currently assigned to the first storage object ID.

In at least one embodiment, processing can include, responsive to detecting the drop SA delta, recording in the MD log a drop SA repeatable delta that marks a second MD log destage cycle of MD log updates to SA statistics for the first storage object ID, wherein the drop SA repeatable delta includes the second LSN denoting a point in time when said reassigning the first storage object ID is performed. Destaging the MD log including the drop SA delta can destage a first instance of a MD log, and wherein the MD log including the drop SA repeatable delta is a second instance of the MD log. Processing can include destaging the second instance of the MD log including the drop SA repeatable delta that marks the second MD log destage cycle of MD log updates to SA statistics for the first storage object ID. Destaging the second instance of the MD log can include responsive to detecting the drop SA repeatable delta, deleting the first corresponding entry from the SOIDHT, wherein the first corresponding entry references the first storage object ID and includes the second LSN denoting a point in time when said reassigning the first storage object ID is performed.

In at least one embodiment, the first storage object and each storage object having a corresponding entry in the SOIDHT is one type of a set of defined object types. The set of defined object types can include any of: a volume or logical device, a file system, a file, a snapshot of a storage object, and a directory. The first operation can be a write operation that writes content to the first storage object resulting in increasing an amount of storage consumed for storing content of the first storage object. The first operation can delete at least some of the content of the first storage object resulting in decreasing an amount of storage consumed for storing content of the first storage object. The first operation can changes an amount of storage consumed for storing content of the first storage object.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 7, 8, 9, 10 and 11 are examples illustrating structures and data flows in at least one embodiment in accordance with the techniques of the present disclosure.

DETAILED DESCRIPTION OF EMBODIMENT(S)

Figure 1:
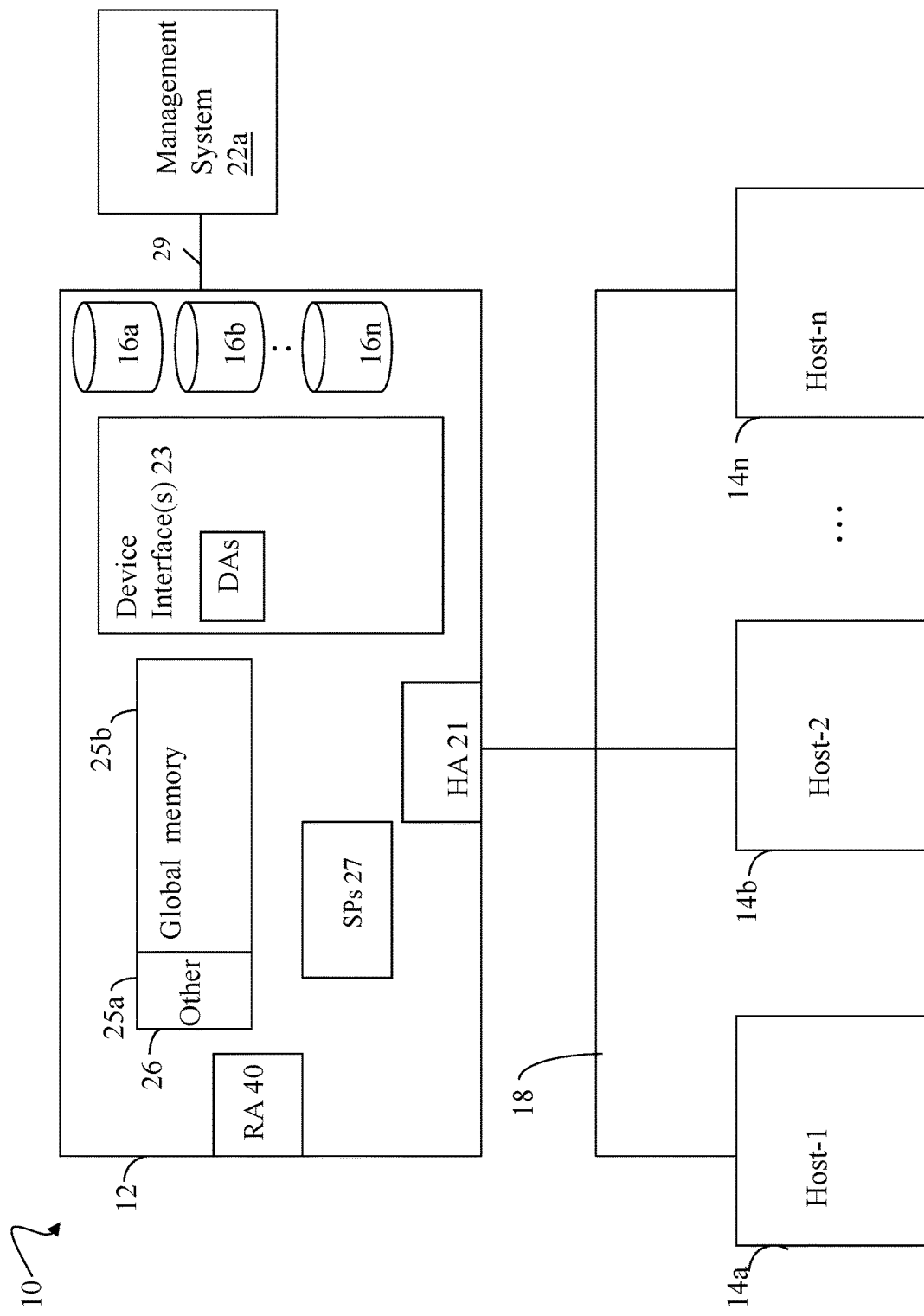
FIG. 1 is an example of components that may be included in a system in accordance with the techniques of the present disclosure.

A data storage system can use a log for recording user or client updates, and can also use a metadata log for recording updates to metadata pages. The metadata (MD) pages can be used in connection with chains of mapping information that map logical addresses to storage locations including content stored at the logical addresses.

An entry from the log of user or client updates (sometimes referred to as the UD (user data) log) can be an update, such as a client write I/O, to a logical address (e.g., LUN or logical device and LBA or logical block address) which writes content to a UD page. Flushing the entry from the UD log can include writing the updated UD page to a backend storage location on non-volatile storage (e.g., BE (back end) PD (physical storage device) location). Additionally, flushing the entry from the UD log can include updating the corresponding MD pages which map the logical address to its corresponding BE PD location including the content stored at the logical address. In at least one existing system, the mapping information including MD pages can thus be updated. For example, such updating of the mapping information can include updating a chain of MD pages used in connection with mapping the logical address to the BE PD location including the content stored at the logical address. In at least one existing implementation, the MD pages of the mapping information can be characterized as a chain forming an access sequence including a top MD page, a mid MD page, a leaf MD page, and a VLB (virtual or virtualized layer block) page, where each page in the foregoing sequence can be accessed serially and also in the strict sequential order of the sequence.

A system can maintain and utilize various statistics or metrics regarding each volume or logical device, or more generally storage object, storing client or user data. For example, one or more statistics can be maintained for each volume or logical device related to storage space accounting. Space accounting or SA statistics can be maintained as part of MD in a system where the SA statistics can be persistently stored on BE non-volatile storage. Since SA statistics can be included in MD maintained per volume or storage object, a mechanism can be used to map a particular volume or storage object identifier (ID) to a corresponding location or address where the particular storage object's SA statistics are persistently stored. The corresponding location or address can be, for example, a particular MD page and offset or LBA in the MD page as stored persistently in a MD tier of BE non-volatile storage.

One approach to maintaining SA statistics for volumes or storage objects can include allocating storage in a MD tier to allow for SA statistics for the maximum allowable volume or storage object ID. Volume or storage object IDs can be assigned based on a monotonically increasing integer sequence from 0 to the maximum allowable volume ID without allowing reuse or reassignment of volume IDs. For example, the maximum allowable volume or storage object ID can be $N=2^{32}-1$, where the MD tier can include storage allocated for storing N+1 sets of SA statistics for N+1 storage objects, and where the allowable storage object ID range can be from 0 to N. Thus the storage object ID can grow to be quite a large integer. However, in actual usage, the number of volumes and other storage objects concurrently existing in the system can be much less than N as storage objects are deleted. For example, in typical usage, the actual maximum number of storage objects concurrently observed in the system can be 32,000. The foregoing approach can result in inefficient usage of BE non-volatile storage that is allocated for storing SA statistics for all N storage objects since the actual number of storage objects in the system at any point in time is so small relative to N. Thus the actual MD storage consumed for storing SA statistics is sparse relative to the storage allocated as the storage object ID increases. A storage object ID can be mapped to a corresponding physical storage location in the MD tier using a simple one-to-one mapping where the storage object ID can be mapped to a fixed LBA or offset in the MD tier where SA statistics corresponding to the storage object ID are stored. Using this mapping with fixed offsets in the MD tier along with the very large storage object ID range can result in the large amount of allocated but unused storage due to the small number of actual concurrent storage objects in the system. Another approach that can be used is to limit or reduce the storage in the MD tier allocated for storing per storage object SA statistics while still allowing storage object IDs to be assigned in the range from 0 through N. In this latter approach, a more complex mapping scheme can be used for the sparse number of actually concurrently used storage object IDs in order to map a storage object ID to a corresponding storage location of the storage object ID's SA statistics. For example, a database or more complex tree-based mapping can be maintained and used to map a storage object ID to a corresponding physical storage location of the storage object ID's SA statistics.

To overcome the drawbacks of the above approaches, at least one embodiment of the techniques of the present disclosure provides for a smaller allowable volume or storage object ID range than the approaches noted above. In at least one embodiment, MAX can denote the maximum number of concurrent storage objects allowed in a system. In at least one embodiment, MAX can be selected based, at least in part, on an actual maximum number of concurrent storage objects that can be expected in the system. In at least one embodiment, the system can perform a mapping from storage object ID to a corresponding MD location of the storage object ID's SA statistics as stored persistently in the MD tier. In at least one embodiment, storage of the MD tier can accommodate MAX sets of SA statistics. In at least one embodiment, a storage object ID can be mapped to a corresponding physical storage location of SA statistics in the MD tier using a simple one-to-one mapping where the storage object ID can be mapped to a fixed LBA or offset in the MD tier where corresponding SA statistics are stored.

In at least one embodiment, a MD log can be used to record updates to MD pages. In at least one embodiment, an update to SA statistics stored in a MD page can be recorded as a MD update in the MD log. Updates to SA statistics as recorded in the MD log, along with other recorded MD updates, can be flushed or destaged from the MD log and applied to persistently stored copies of corresponding MD pages.

In at least one embodiment, storage object IDs of deleted storage objects can be reused or reassigned to newly created storage objects. However, when a storage object ID, such as of a deleted volume, is reassigned to another volume instance, there can be outstanding activities remaining in the system that are associated with the prior deleted volume instance rather than the new volume instance. Such outstanding activities can include SA updates related to the prior volume instance. In this manner, the SA statistics for the new volume instance can be inconsistent since it may reflect SA statistics updates related to the prior deleted volume instance of the same volume ID. Guaranteeing consistency of SA statistics in such a case where volume or storage object ID reuse and reassignment as noted above can occur is not a trivial task, and possible solutions can undesirably require additional processing time and can undesirably and generally consume additional system resources. Some solutions can include performing additional processing to track and remove outstanding activities, including any outstanding SA statistics updates, that may not yet have been processing for the deleted volume instance before reassigning the storage object ID of the deleted volume. For example, one solution can allow reuse or reassignment of storage object IDs only after some specified period of time in order to allow any outstanding SA updates related to the prior volume instance to be flushed from the MD log. However in some scenarios it may not be possible to wait the specified period of time before allowing reuse or reassignment of a storage object ID. In another solution, a generation value can be associated with each storage object ID where a generation value is increased each time a storage object ID is reused. One adverse effect of using generation values is that now such generation values need to be tracked per storage object ID. Another adverse effect is that the amount of memory consumed has increased in that both a storage object ID and its corresponding generation value are now required in connection with various processing workflows and structures. For example, each recorded update of the MD log for a SA statistic update must include both the storage object ID and the corresponding generation number thereby reducing the number of MD updates that can be recorded and aggregated without further increasing the size of the MD log. In the latter solution using generation values, there is added processing and complexity in that the system tracks the storage object IDs and associated generation values and can examine the recorded MD updates of the MD log as they are flushed. If a MD update does not relate to the latest or most recent generation value, the MD update can be ignored.

In at least one embodiment, the techniques of the present disclosure provide for accurate SA statistics per volume, or more generally per storage object, while also allowing storage object ID reuse and reassignment without adversely impacting performance and system resource utilization as in other potential alternative solutions some of which are noted above. In at least one embodiment, the techniques of the present disclosure provide for improved aggregation of MD log updates in comparison to other potential alternative solutions some of which are noted above.

In at least one embodiment, the SA statistics for a volume or more generally a storage object can include an amount of physical storage space (e.g., BE non-volatile storage) consumed by the storage object, and/or an amount of logical storage space consumed by the storage object. In at least one embodiment providing data deduplication such that client data can be deduplicated such that multiple logical addresses of multiple storage objects reference a single unique stored instance of content or data, the SA statistics of a storage object can include a number of unique physical pages, blocks or other amount of physical storage of consumed for storing unique content (e.g., not deduplicated content) of the corresponding storage object. In at least one embodiment, the amount of physical storage consumed for storing unique content for a storage object can denote an amount of physical storage that would be freed or reclaimed if the storage object is deleted. In at least one embodiment, the SA statistics can be used by the storage system in connection with storage-related processing such as: determining a current amount of used and/or free available storage in the system, establishing and enforcing defined storage usage quotas or thresholds, determining whether current storage consumption meets one or more specified thresholds triggering low or an insufficient amount of physical storage, predicting when a storage system may potentially run out of free storage or otherwise be expected to reach a defined minimal level of storage, and/or determining whether to allow or otherwise deny a client write operation or request that would result in exceeding a specified usage threshold.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device or other non-volatile storage device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least some of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
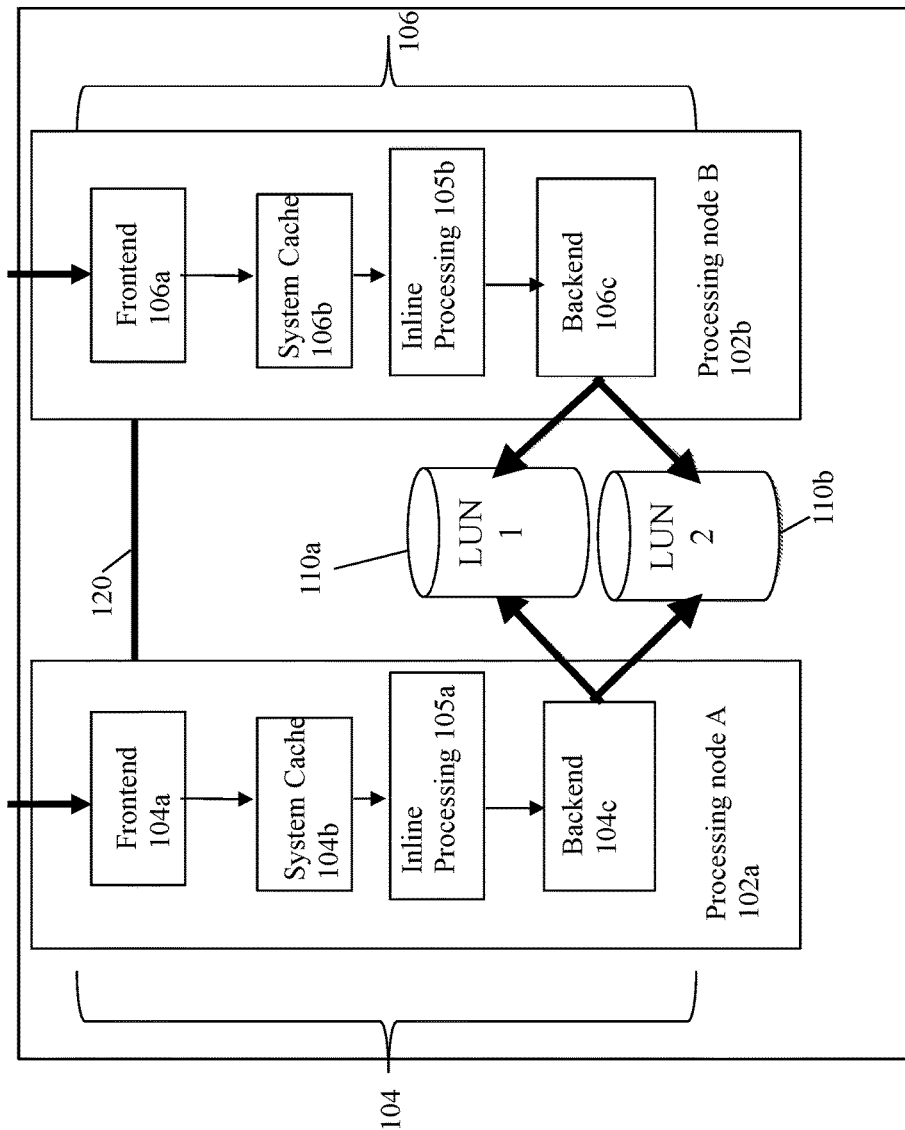
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
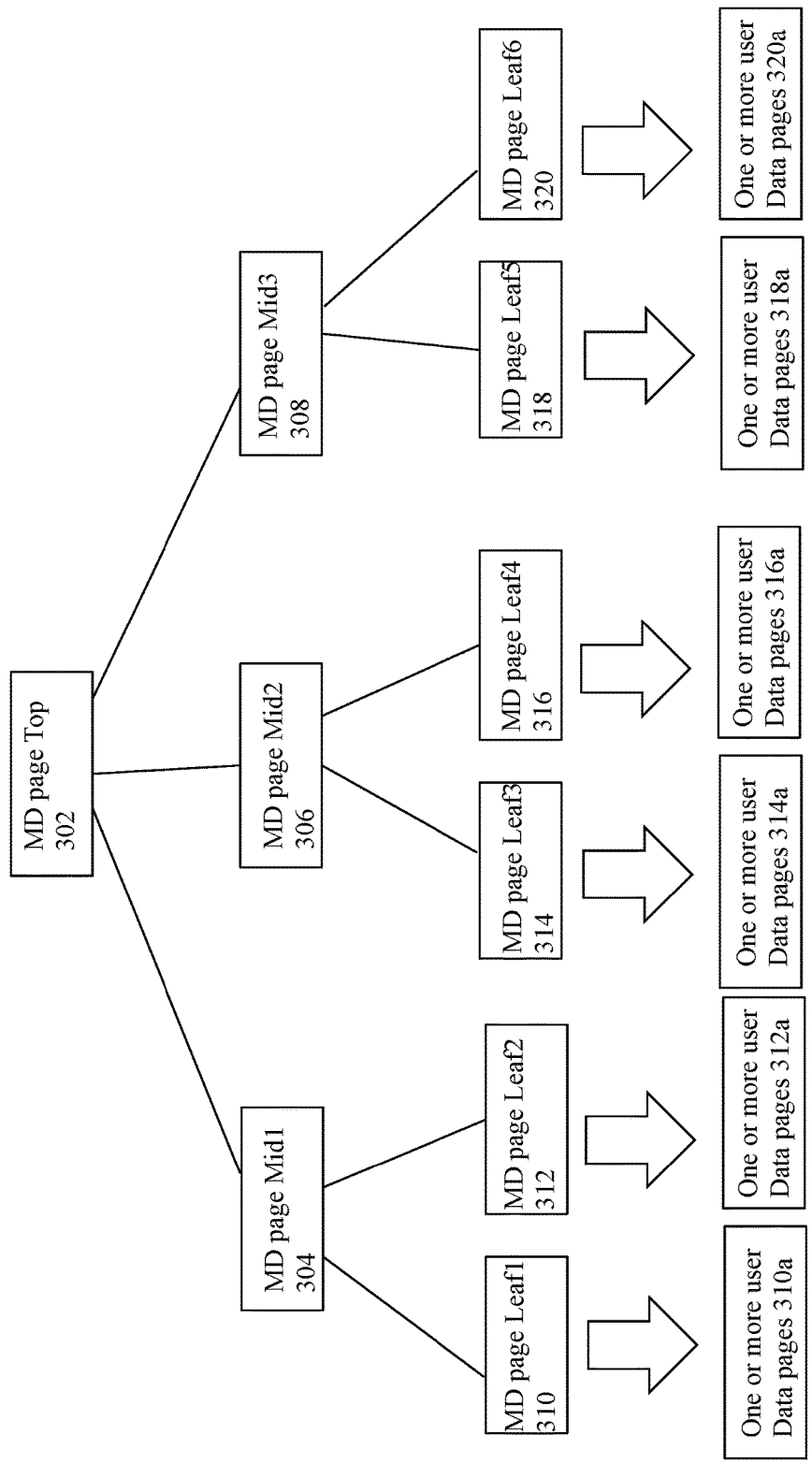
FIGS. 3, 4, 5 and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log such as a user data (UD log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
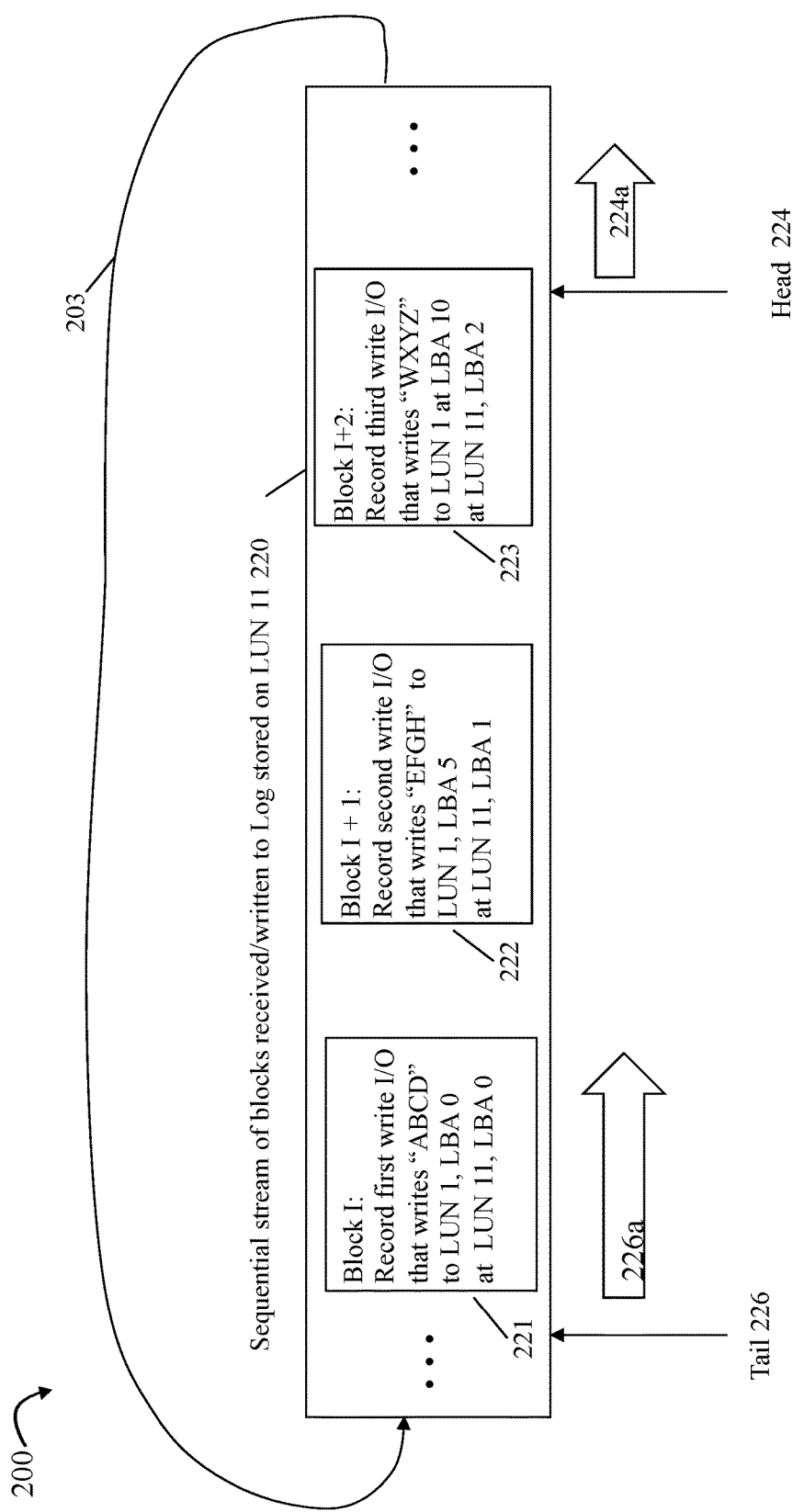
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224*a* to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226*a* sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
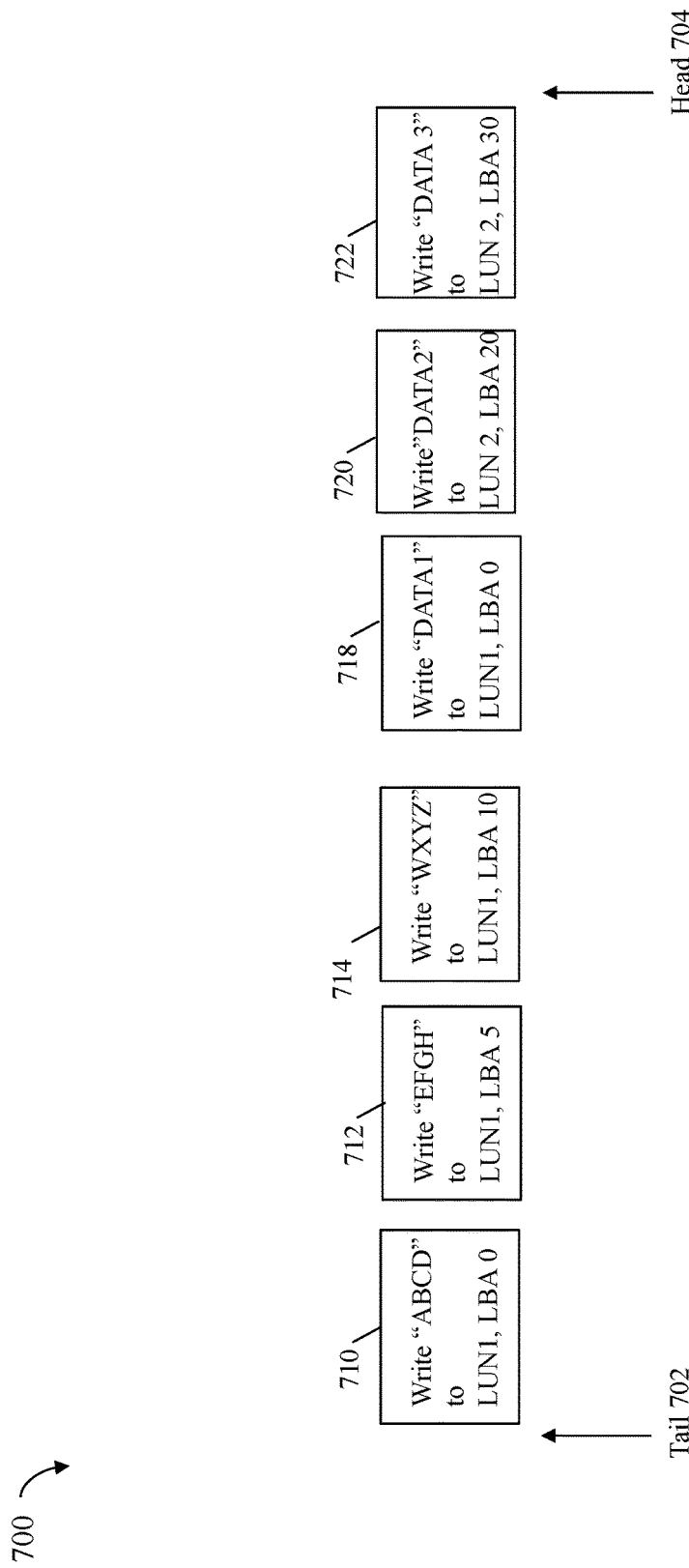

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
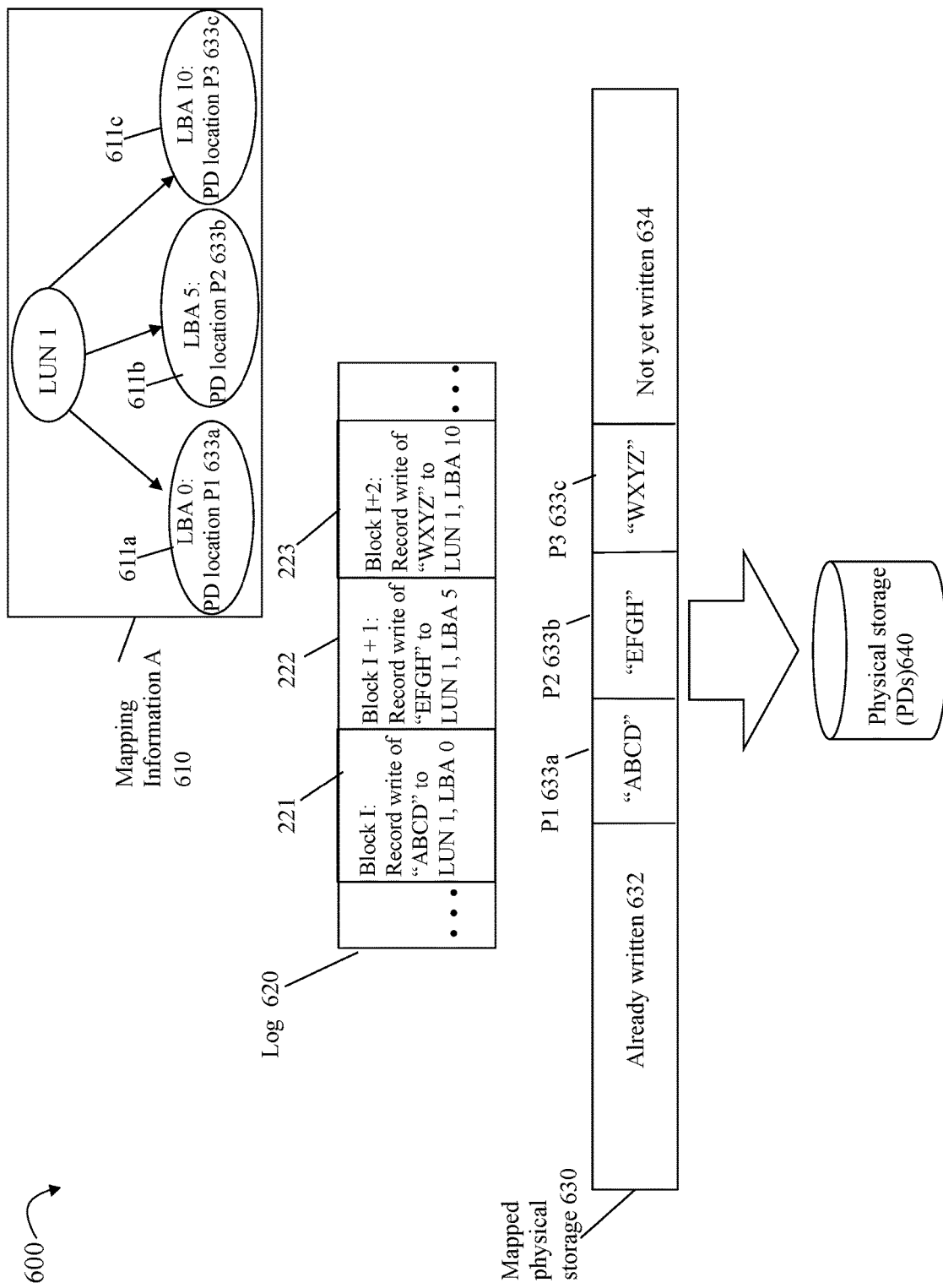

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels-a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
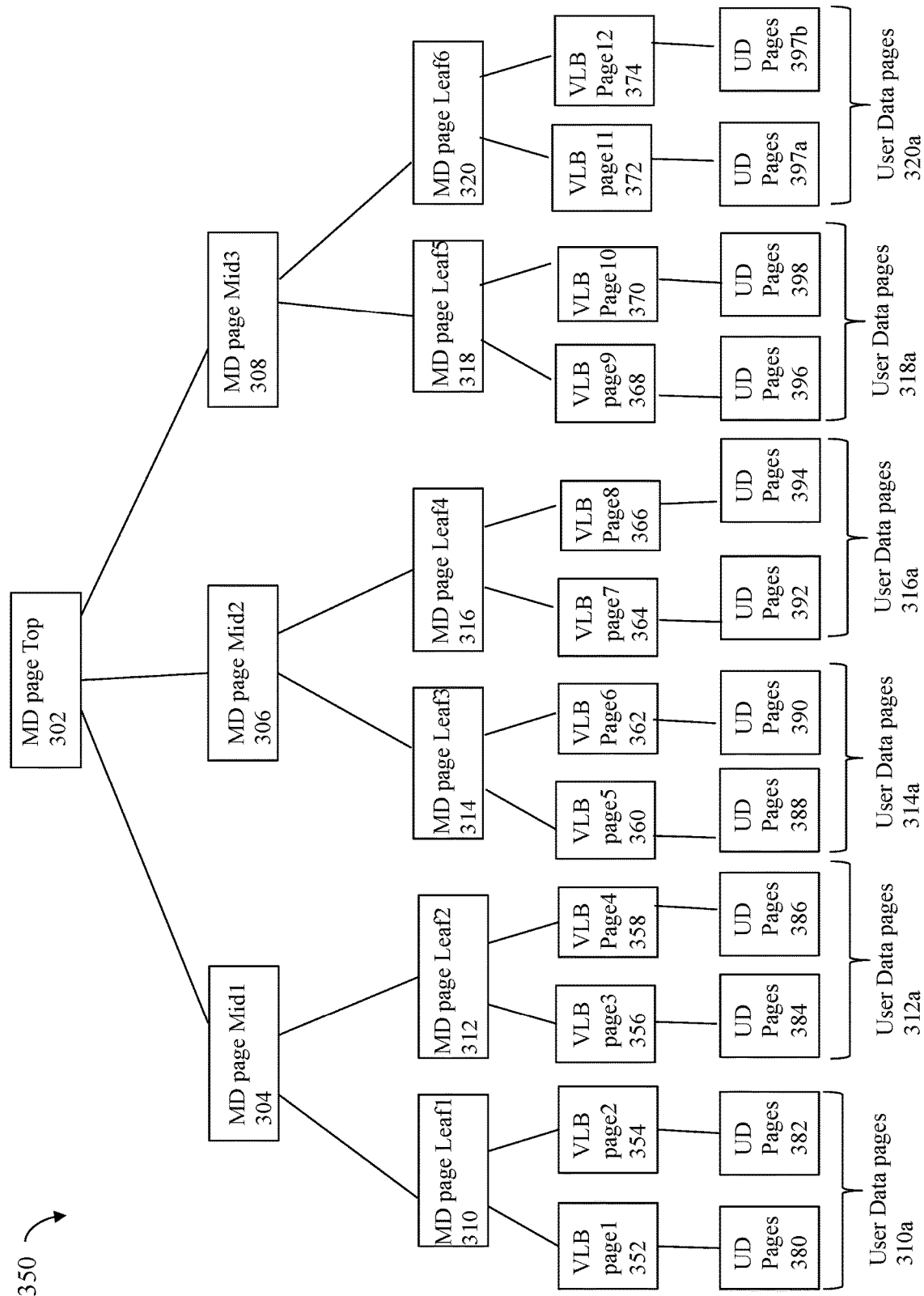

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
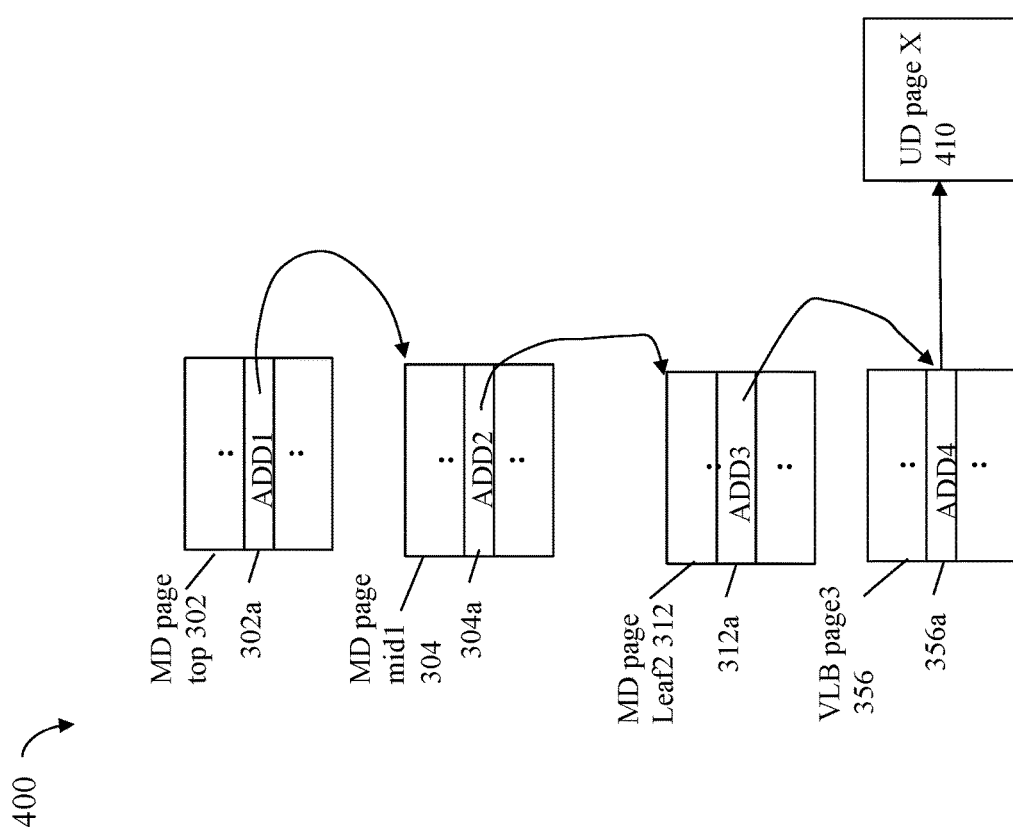

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
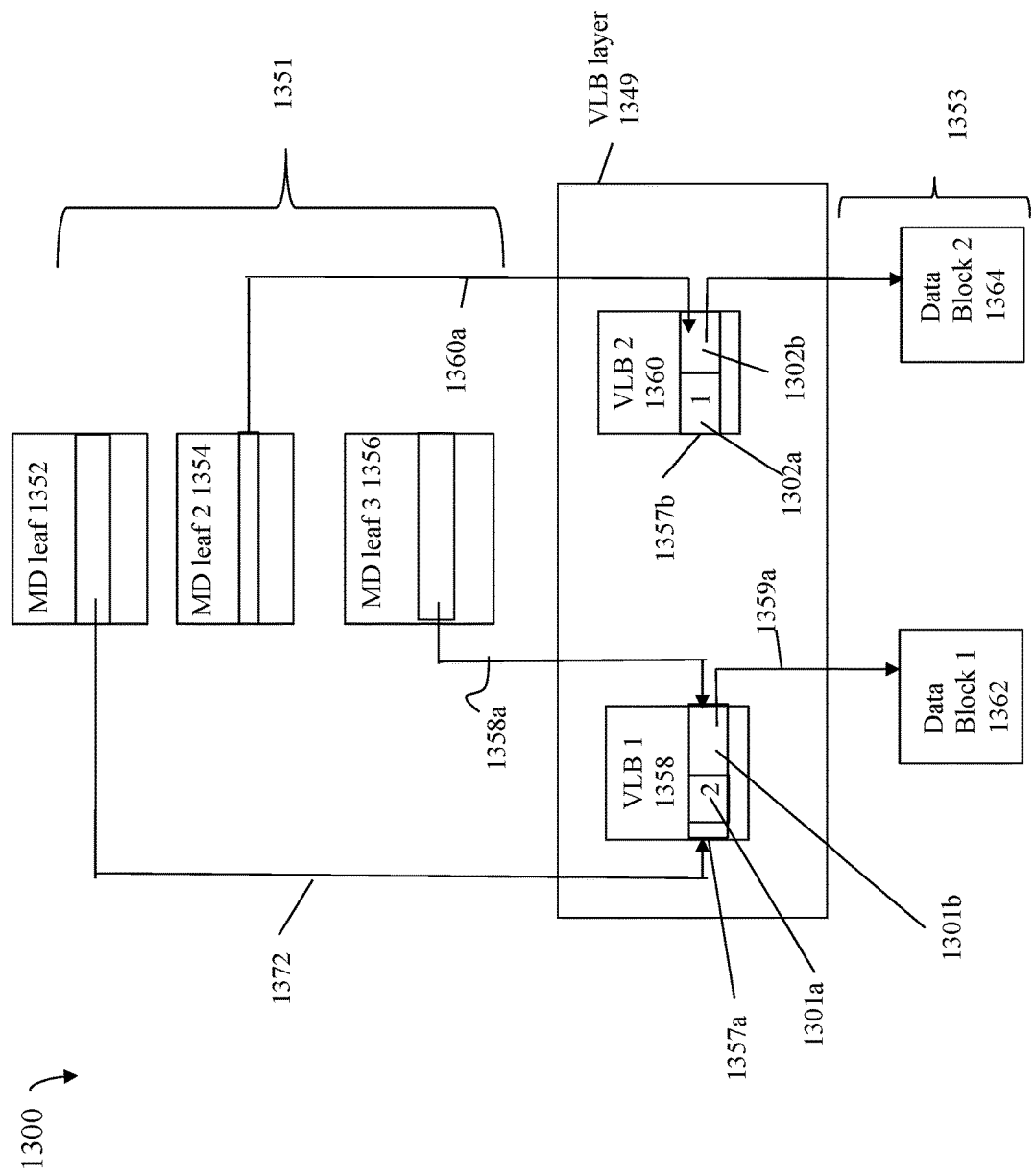

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

The reference count 1301a can be initialized to 1 when a first or initial instance of the associated data block 1362 is stored. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

The reference count 1302a can be initialized to 1 when a first or initial instance of the associated data block 1364 is stored. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. In particular, the MD leaf 1354 references or points (1360a) to the VLB entry 1357b associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing in at least one embodiment, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6). In at least one embodiment, the LI can denote or can be the logical address, offset or location of the MD page. In at least one embodiment, the logical address, offset or location of the MD page can also be or denote the physical address, location or offset of the MD page as stored persistently on non-volatile storage, such as of the BE PDs of the data storage system.

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 or 64 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7:
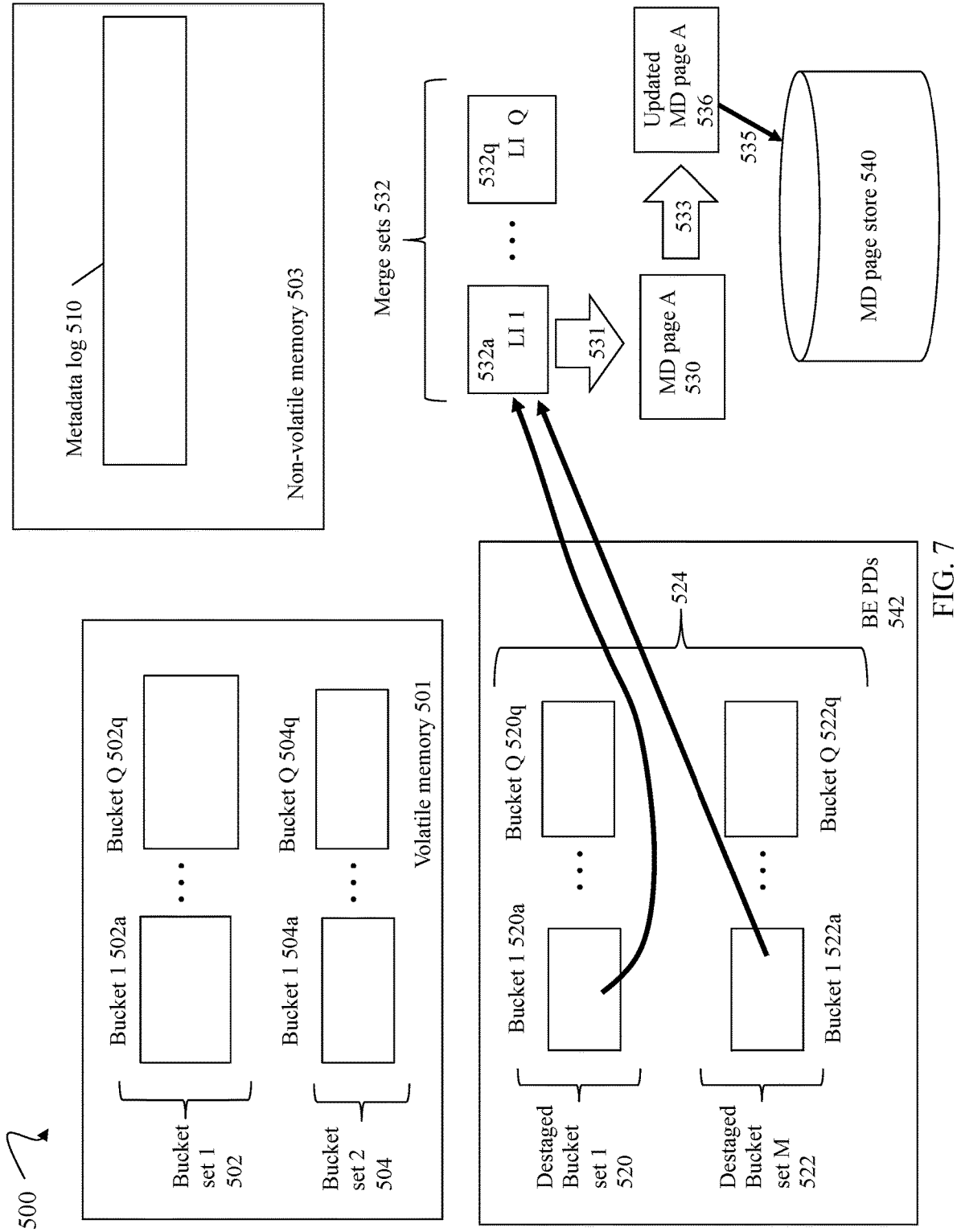

Referring to FIG. 7, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets

502, 504 where at any point in time, one of the two buckets sets 502, 504 can be designated as the active set and the remaining bucket set can be designated as the destaging, frozen, or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets (e.g., hash-based sorted buckets or HBSBs) implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520*a* of the destaged bucket set 1 520 can include metadata updates for the MD page A as noted above. The bucket (e.g., 520*a*) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520*a*, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520*a*, 522*a*) in each of the M destaged bucket sets of 524. The second phase of destaging can aggregate and combine the metadata updates for the MD page A 530 from the first buckets (e.g., 520*a*, 522*a*) across the multiple M destaged sets 524 of metadata updates as stored on the BE PDs 542 in the first phase of destaging. The element 532*a* can denote the merge set of aggregated updates from the first buckets 520*a*, 522*a* of the destaged sets 524 for the MD page A 530. Thus the merge set or working set 532*a* of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532*a* of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532*a-q* based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

It should be noted that destaging the in-memory metadata log can generally be performed in a single phase or other suitable manner. For example, destaging the metadata log can be performed by processing and merging bucket sets without intermediate storage on the BE PDs. Rather, destaging the metadata log can include determining the merge sets using destaged bucket sets and merge sets stored in volatile memory.

As noted above in at least one embodiment, storage accounting or SA statistics can be recorded and maintained in connection with different types of storage objects and/or various SA statistics at other levels such as at a system-wide level. For example in at least one embodiment, storage object-level SA statistics can vary with the particular type of storage object and can include an amount of physical storage consumed by an individual storage object, an amount of physical storage storing unique content per storage object, and/or a logical size per storage object. In at least one embodiment, system-level SA statistics can include an amount of free or available storage capacity (e.g., BE non-volatile storage capacity) in the system with respect to all storage objects, and/or an amount of consumed or used storage capacity in the system.

SA statistics can generally have a high update rate. For example, in at least one embodiment, each host or client write operation can result in updating one or more SA statistics. For example, a write operation from a host can result in writing content C1 to a logical address LA1, where LA1 denotes a volume or LUN V1 and an LBA or offset. As a result of the write operation, an additional amount of BE non-volatile storage, A1, can be used to store the new content C1. As a result, the amount of physical storage consumed by the volume V1 can increase by A1. Other operations can also result in updating an SA statistic. For example, a user can delete specified LBAs or offsets of the volume V1. As a result, the amount of physical storage consumed by V1 can decrease by an amount based on the LBAs or offsets of V1 that are deleted.

Discussion in the following paragraphs can sometimes refer to a volume identifier (ID) of a volume, logical device or LUN. A volume ID can more generally be referred to as a storage object (SO) ID where the techniques of the present disclosure are more generally applicable for use with multiple types of SOs and is not limited to use just with volumes.

In at least one embodiment, the SA statistics can vary with the particular type of storage object or SO. In at least one embodiment, a storage object can be one of multiple defined types including any of: a volume or logical device, a file system, a file, a directory, a snapshot of a volume or other storage object, and/or one or more other types.

In at least one embodiment, each storage object (SO) identifier (ID) can be associated with a physical object, record or structure describing a particular SO instance assigned the SOID. In at least one embodiment, the physical object can be an inode structure associated with a corresponding SOID. When an SOID is reused or reassigned from an old storage object instance to a new storage object instance, its corresponding physical object can be reused with the new storage object instance. In such an embodiment, the SOID, such as a volume ID, can be a logical reference to the corresponding inode or other physical structure describing the SO that is assigned the SOID. In at least one embodiment, the inode or other physical structure can, for example, identify portions of a system logical address space mapped to a corresponding SO. In at least one embodiment, the particular MD top node or page (as well as other pages of mapping information) can be determined based on the logical address space portion mapped to a corresponding SO.

In at least one embodiment, MAX can denote the maximum concurrent number of storage objects allowed or supported in the storage system. In at least one embodiment, the storage system can have an array or table, such as an inode table, of MAX physical structures.

In at least one embodiment, the techniques of the present disclosure provide for tracking reassignments of SOIDs that are in progress. As used herein in at least one embodiment, reassignment in progress with respect to an SOID can denote that the SOID has been reassigned from a first object instances to a new second object instance, and where there may still be outstanding activity (including SA statistic updates) pending for the prior first object instance.

In at least one embodiment, the techniques of the present disclosure provide for tracking the logical sequence number or LSN at the time of each SOID reassignment or reuse where such LSN can then be used to identify and drop, skip or ignore obsolete outstanding activity, such as SA statistic updates, associated with the old prior first object instance that was previously assigned the SOID that has been reassigned. The LSN can denote a point in time or timestamp as to when the SOID reassignment occurred relative to other recorded activities also having associated LSNs. In at least one embodiment, the other recorded activities can include recorded write operations of the UD log.

In at least one embodiment, a SOID hash table (HT) can be maintained for SOIDs that are in the state of reassigning/reassignment in progress (e.g., such that outstanding activity associated with the prior object instance before reassignment may not yet be cleared, drained or cleaned from the system).

In at least one embodiment, each time a SOID is reassigned or reused, processing can be performed to: add an entry for the SOID along with a corresponding LSN (also referred to as a reassign LSN) to the SOIDHT; and add a corresponding dropinode SA delta, update or tuple in the MD log. The dropinode SA delta (sometimes referred to as a drop SA delta) can include the reassign LSN and can include a reference to the SOID. In at least one embodiment, the dropinode SA delta can represent that all prior SA statistic updates for the SOID occurring before the point in time denoted by the reassign LSN are no longer relevant (e.g., are invalid) and should be dropped during MD log destage of SA statistics updates associated with the SOID. Such existing SA statistic updates for the SOID occurring in the MD log before the dropinode SA delta correspond to an old or prior SO previously but not currently assigned the SOID. In at least one embodiment, the dropinode SA delta can represent that all SA statistic updates for the SOID occurring after the point in time denoted by the reassign LSN are relevant (to the new SO reassigned the SOID) and should be applied during MD log destage of SA statistics updates associated with the SOID. Such existing SA statistic updates for the SOID occurring in the MD log after the dropinode SA delta correspond to the new or current SO to which the SOID has been reassigned/is currently assigned.

In at least one embodiment, the dropinode SA deltas can also be applied and used in connection with recovery processing to recover the SOIDHT. Consistent with other discussion herein (e.g., FIG. 7), the MD log can include a persistent MD log and an in-memory MD log (e.g., buckets sets or HBSBs 502, 504). Recovery processing can be performed, for example, when the storage system is rebooting such as after a system failure, error or other event that caused the system to go down or offline and then subsequently triggered the reboot. As a consequence of the system failing or going offline, contents of the volatile memory such as the in-memory MD log can be lost. Upon reboot, recovery processing can be performed. The recovery processing can include using the contents of the persisted MD log to restore and populate the in-memory MD log. The presence of the dropinode SA delta in the MD log means that there is a reassignment in progress for the corresponding SOID. Recovery processing can include reading the persistent MD log and encountering a dropinode SA delta. In response, recovery processing can add the dropinode SA delta to the in-memory MD log and also add a corresponding entry to the SOIDHT for the SOID and reassign LSN referenced in the dropinode SA delta.

In at least one embodiment, the techniques of the present disclosure can remove the entry for an SOID from the SOIDHT after two MD log destage cycles have completed. More generally, the entry for the SOID can be removed from the SOIDHT after a specified number of MD log destage cycles have occurred thereby denoting a time period during which all in progress or outstanding activity of the prior storage object (previously assigned the SOID) is guaranteed to be drained or completed. In at least one embodiment such as described in connection with FIG. 7, it can be guaranteed that all such outstanding, pending or in progress activity related to the prior storage object is completed or drained from the UD log and MD log after 2 MD log destage cycles have passed since the SOID reassignment is performed. In at least one embodiment, such outstanding, pending or in progress activity related to the prior storage object may actually be completed or drained from the UD log and MD log prior to the completion of the 2 MD log destage cycles. However in at least one embodiment, waiting for completion of 2 MD log destage cycles subsequent to reassignment of the SOID can guarantee that all such outstanding, pending or in progress activity related to the prior storage object is completed or drained.

In at least one embodiment, when flushing from the UD log a recorded write operation directed to a target volume or storage object having an associated SOID, a corresponding MD log update can be recorded to update a SA statistic. For example, the write operation can write content that results in increasing the amount of physical storage space consumed or used by the target volume. In this case, the SA statistic—denoting the amount of physical storage space used by the target volume—can be increased by an amount needed to store the content written. In at least one embodiment, an update can be recorded in the MD log to increase the target volume SA statistic by an amount corresponding to the content written. In accordance with the techniques of the present disclosure during UD log flush, prior to recording an update in the MD log to update the SA statistic, processing can be performed to check whether there is a reassignment in progress for the target volume. In at least one embodiment, processing can include querying the SOIDHT to determine whether there is an existing SOIDHT entry corresponding to the target volume. If not, the SA statistic update can be recorded in the MD log. If there is a corresponding SOIDHT entry for the target volume, the reassign LSN of the SOIDHT entry can be compared to the LSN of the recorded write operation. If the LSN of the recorded write operation is less than the reassign LSN, the SA statistic update is dropped or ignored and thus not recorded in the MD log; and otherwise the SA statistic update can be recorded in the MD log. Thus the foregoing processing performed in connection with flushing the UD log in at least one embodiment can avoid recording in the MD log additional SA statistic updates that are irrelevant or obsolete in that they would apply to the old or prior volume previously assigned (and no longer assigned) the SOID. Although the foregoing describes updating a single SA statistic, more generally, multiple SA statistics can be updated related to the target volume or storage object and/or system level statistics. Additionally, although the foregoing describes a recorded operation or command in the UD log that is a write operation or command, more generally, other command or operations can be recorded in the UD log that when flushed result in updating one or more SA statistics of one or more SOs or volumes. As another example, other supported UD commands recorded in the UD log can include a delete command that deletes one or more SOs or volumes, and/or modifies (increases or decreases) the logical address space or logical size of a SO. In at least one embodiment, querying the SOIDHT can be characterized as an inexpensive operation based, at least in part, on the efficiency of hashing, and the expectation that the SOIDHT typically includes a very small number or no entries.

In at least one embodiment, the dropinode SA deltas recorded in the MD log are encountered during MD log destage. For a dropinode SA delta referencing an SOID, all SA updates or deltas that: 1) relate to the SOID, and 2) are recorded or ingested in the MD log prior to the doprinode SA delta, are dropped or ignored during MD log destage. Such SA updates or deltas meeting the foregoing two conditions or criteria are related to the prior incarnation or prior SO previously assigned the SOID before reassignment. The dropinode SA deltas are flushed from the MD log but not actually destaged or applied to any MD page. Thus the dropinode SA deltas can serve as markers of what SA statistic update deltas or tuples of the MD log are invalid or obsolete and should be dropped or ignored, and what SA statistic update deltas or tuples of the MD log are valid and should be destaged and applied.

In at least one embodiment where two MD log destage cycles define the time period during which outstanding or pending activity related to the prior SO previously assigned the SOID is allowed to drain or complete, encountering the dropinode SA delta referencing the SOID indicates that a single MD log destage cycle as completed. In at least one embodiment, a single MD log destage cycle can include destaging updates of a frozen instance of an in-memory MD log such as discussed elsewhere herein (e.g., such as the frozen one of the bucket sets 502, 504 in connection with FIG. 7). Thus one additional MD log destage cycle still needs to complete. In at least one embodiment, when the dropinode SA delta referencing the SOID is encountered in MD log destage, a dropinode SA repeatable delta (sometimes referred to as a drop SA repeatable delta) can be recorded or added to the MD log for the SOID to mark the second MD log destage cycle or lifetime. In at least one embodiment consistent with other discussion herein, the dropinode SA repeatable delta can be added to the active in-memory MD log instance (e.g., active one of the bucket sets 502, 504 of FIG. 7) as well the persistent MD log (e.g., element 510 stored in NVRAM in FIG. 7). Subsequently the active in-memory MD log instance can transition to the frozen state and be destaged where 1) the dropinode SA repeatable delta is flushed but not applied to any MD page; and 2) the corresponding entry for the SOID of the SOIDHT can be removed from the SOIDHT (since the time period of 2 MD log destage cycles has elapsed denoting that the any/all outstanding activity is now drained or complete for the prior SO previously assigned the SOID). In at least one embodiment, the dropinode SA repeatable delta can include the same fields and same semantics as the dropinode SA delta. In at least one embodiment, destaging the dropinode SA repeatable delta can denote completion of the second MD log destage cycle; and destaging the dropinode SA delta can denote completion of the first MD log destage cycle.

In at least one embodiment during recovery processing, processing can be performed to reconstruct the volatile SOIDHT structure. In at least one embodiment, recovery processing can include initializing the SOIDHT as an empty HT. When recovering the in-memory MD log from the persisted MD log, each time a dropinode SA delta or a dropinode SA repeatable delta is found, a corresponding entry is added to the in-memory SOIDHT.

In at least one embodiment, the dropinode SA repeatable delta can be further extended and used as may be needed to further extend the time period to more than 2 MD log destage cycles. Consistent with other discussion herein, the time period of 2 MD log destage cycles denotes the amount of time needed to guarantee that outstanding activity for a prior incarnation or SO instance previously assigned an SOID (that is reassigned or reused) has drained or completed. In some embodiments, the time period can be a different number of MD log destage cycles such as 3. In such an embodiment, the dropinode SA repeatable delta can be further extended to include a counter field denoting a number of remaining MD log cycles yet to complete. For example, if 2 additional MD log destage cycles are needed to thereby collectively indicate a time period of 3 MD log destage cycles, the counter of the dropinode SA repeatable delta can be set to 2. When encountered during MD log destage, the counter value of the dropinode SA repeatable delta can be decremented by 1 and examined. If the value of the counter is 0, then 2 additional MD log destage cycles have completed. Otherwise, if the value of the counter is greater than 0, the counter value can be decreased by 1, and another dropinode SA repeatable delta can be recorded in the MD log with the revised counter value.

In accordance with the techniques of the present disclosure, outstanding activity including SA statistics updates for of a prior incarnation or SO associated with a reassigned SOID can be ignored, skipped or dropped. For example, consider an SOID that was assigned to a first SO, SO1. The first SO may have been deleted and its SOID reused or reassigned to a second SO SO2. In at least one embodiment, the outstanding activity of the old or prior storage object instance SO1 associated with the reused or reassigned SOID can include recorded writes of the UD log. The recorded writes W1s are directed to the SOID but occurred when the SOID was assigned to the old/prior first storage object SO1 rather than the new second storage object SO2. The W1s may not have yet been flushed from the UD log even though the SOID is now reassigned from SO1 to SO2. Put another way, the SOID reassignment from SO1 to SO2 may have occurred at a point in time T1 where the W1s directed to SO1 as recorded in the UD log occurred prior to T1, and where the W1s have not been flushed from the UD log prior to T1. As such, the unflushed W1s recorded in the UD log as well as any associated SA statistic updates generated by the unflushed W1s, can be skipped, ignored or dropped. In at least one embodiment, the outstanding activity of the old or prior storage object instance SO1 can also include updates to SA statistics as recorded in the MD log, where such SA statistic updates of the MD log have not yet been flushed or destaged prior to the time T1. As such, such SA statistic MD updates as recorded in the MD log can be dropped, skipped or ignored.

In at least one embodiment, an SOID assigned to a first storage object SO1 can be reused or reassigned if the SO1 is deleted or removed. In at least one embodiment, SO1 can be removed or deleted in response to a user or client command such as to delete a volume assigned the SOID. In at least one embodiment, SO1 can be a snapshot assigned the SOID where the snapshot is deleted or removed. In at least one embodiment, the snapshot can be a user or client snapshot that is deleted by a user or client. In at least one embodiment, the snapshot can be a storage system internal snapshot that may not be exposed externally to a host or other storage client. The storage system internal snapshot can be deleted by code executing on the storage system as part of a workflow on the storage system.

In at least one embodiment, the SOID assigned to SO1 can be reassigned to another second storage object instance SO2 as part of code executing in a storage system workflow. For example, a first volume V1 can be assigned the SOID. An operation or command can be issued to replace the contents of V1 with the contents of another second volume V2. Servicing this operation or command can include reassigning the SOID from V1 to V2.

Figure 8:
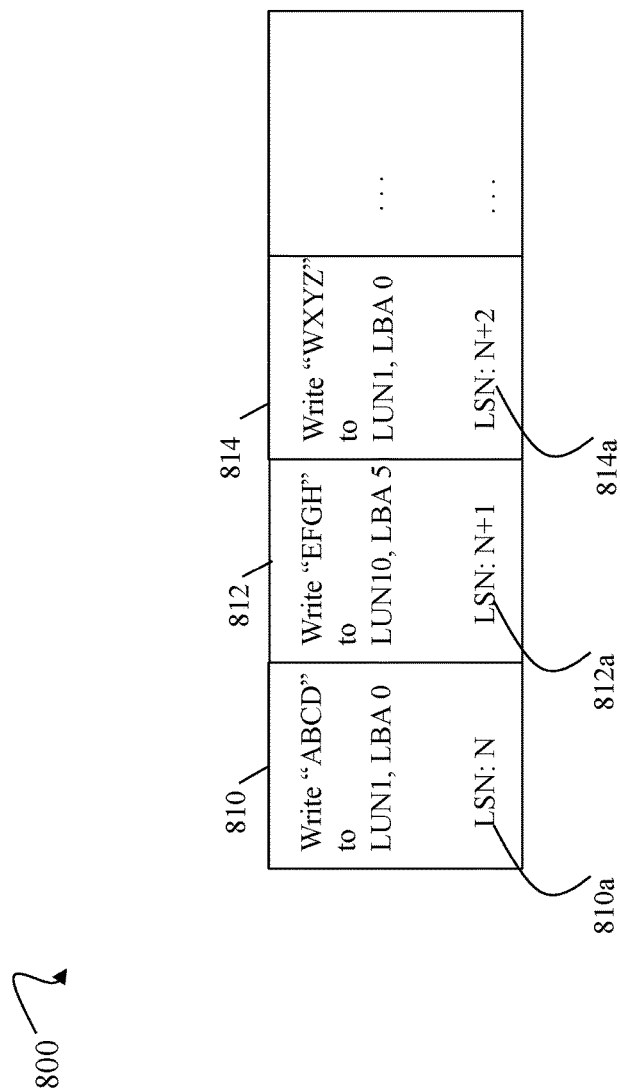

Referring to FIG. 8, shown is an example 800 illustrating a UD log in at least one embodiment in accordance with the techniques of the present disclosure.

Consistent with other discussion herein, each write operation or request, along with possibly other types of commands, operations or requests, recorded in the UD log can include information describing the recorded operation along with a logical sequent number or LSN. The example 800 illustrates a consecutive sequential order in which write operations or requests are recorded in the UD log, from left to right, as described, for example, in connection with FIGS. 2B and 2C. The leftmost record or entry 810 denotes the earliest recorded first write operation of the UD log. Record or entry 812 denotes a second write operation received and recorded in the UD log after entry 810. Record or entry 814 denotes a third write operation received and recorded in the UD log after entry 812. Write operations received subsequent to the third write operation corresponding to entry 814 can be similarly recorded in consecutive sequential entries of the UD log following entry 814.

In at least one embodiment, each record of the UD log can be assigned a unique LSN (logical sequence number). The LSN assigned to each record can denote a next LSN in a sequence of LSN values. In at least one embodiment, an LSN counter can be an integer counter or index that is incremented, such as by 1, each time a new write or other operation is logged in a next record of the UD log. The value of the LSN counter can always increase and can denote an absolute location or record number in the UD log file. When logging an operation in a record of the UD log, the current value of the LSN counter can be assigned to the record. Subsequently the LSN counter is incremented.

Thus, each record of the UD log can be assigned a different LSN and can be assigned the current value of the LSN counter. The LSN may be used to denote a sequential time ordering and relative position of the records in the UD log. Thus each record and logged write of the UD log can have a unique LSN where the logged writes are applied in a write consistent order based on the increasing LSNs associated with the UD log records. For example, to maintain write order consistency of data, logged writes are logically applied in a sequential order based on the increasing LSNs where the log record with LSN=N is applied prior to the record with LSN=N+1. Any optimization performed, such as to flush selected UD log records in parallel, must maintain the same data consistency and resulting data as if the UD log records had been flushed and destaged in sequential order based on increasing LSNs of the UD log records.

In the example, 800, the entry 810 can be assigned an LSN of N; the entry 812 can be assigned an LSN of N+1; and the entry 814 can be assigned an LSN of N+2. In a similar manner, a fourth write recorded in the next consecutive sequential entry of the UD log subsequent to the entry 814 can be assigned an LSN of N+3. Thus the LSN in at least one embodiment can denote a timestamp associated with an ingested or recorded write operation recorded in the UD log relative to other LSNs or timestamps associated with other recorded write operations of the UD log.

Figure 9:
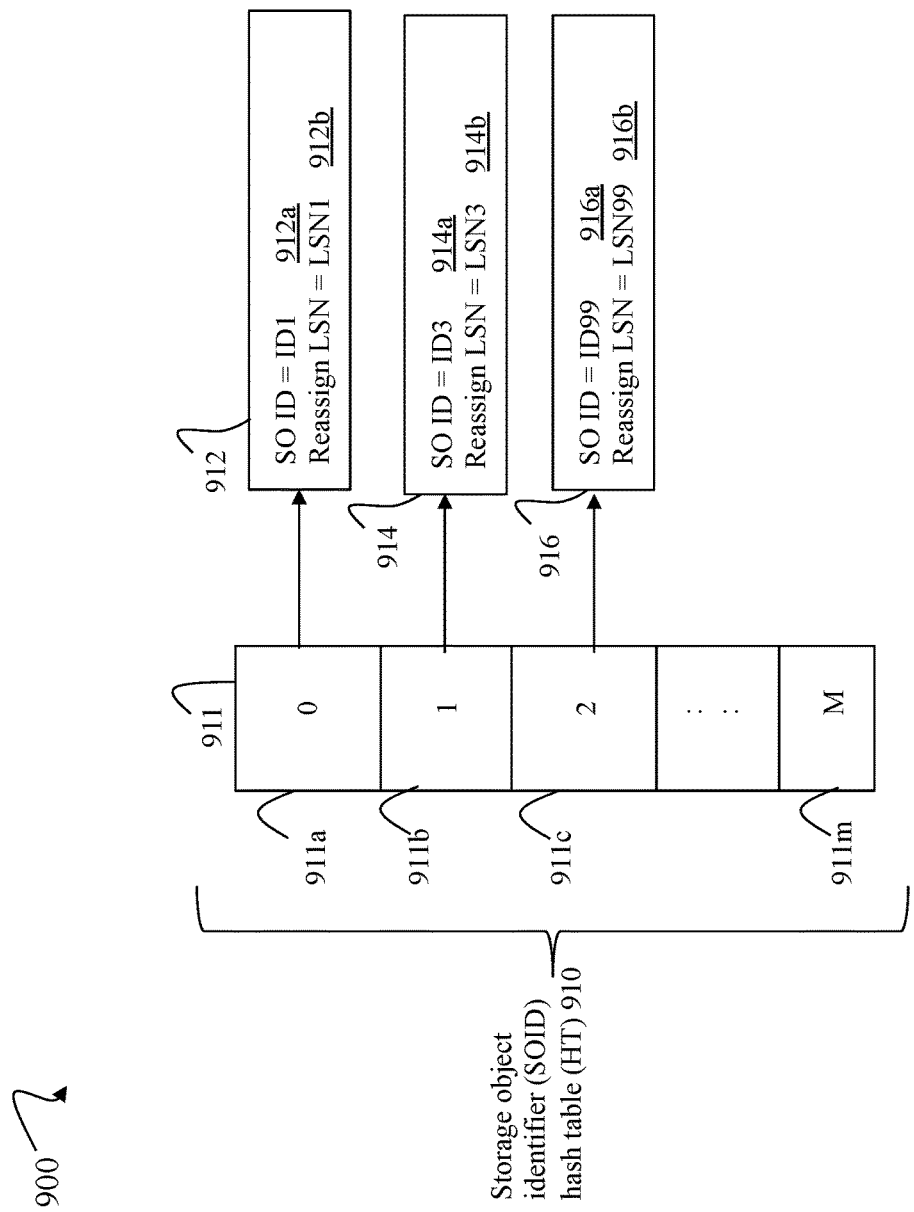

Referring to FIG. 9, shown is an example 900 of a storage object (SO) identifier (ID) hash table (HT) that can be used in at least one embodiment in accordance with the techniques of the present disclosure.

The example 900 includes the SOIDHT 910 with M hash lines or indices 911.

Hash line or index 0 911a is associated with entry 912 denoting that entry 912 represents an SOIDHT entry of a SO ID that maps to SOIDHT index 0. The entry 912 represents a reassigned or reused SOID=ID1 (912a) having a reassigned LSN=LSN1 (912b).

Hash line or index 1 911b is associated with entry 914 denoting that entry 914 represents an SOIDHT entry of a SO ID that maps to SOIDHT index 1. The entry 914 represents a reassigned or reused SOID=ID3 (914a) having a reassigned LSN=LSN3 (914b).

Hash line or index 2 911c is associated with entry 916 denoting that entry 916 represents an SOIDHT entry of a SO ID that maps to SOIDHT index 2. The entry 916 represents a reassigned or reused SOID=ID99 (916a) having a reassigned LSN=LSN99 (916b).

Hash line or index M 911m is currently not associated with any entries denoting that there is currently no SOID that has been reassigned or reused with a corresponding SOIDHT entry that maps to SOIDHT index M.

In at least one embodiment, the SOIDHT can be organized as a hash table where an SOID is mapped to a particular SOIDHT index 911 using a hash function HF. In at least one embodiment, each of the SOIDHT indices 911a-m can be associated with a linked list of 0 or more corresponding SOIDHT entries having SOIDs that are mapped by the hash function HF to a corresponding one of the indices 911a-m. The hash function HF can take as an input the SOID, denoted as HF (SOID), that generates a hash value HV1 based on the SOID, where HV1 is mapped to one of the indices 911a-m. For example, for entry 912 HF (ID1)=0; for entry 914 HF (ID3)=1; and for entry 916 HF (ID99)=2.

In at least one embodiment, an entry can be recorded in the SOIDHT for each reassigned or reused SOID along with the current LSN. The current LSN can denote the current point in time at which the SOID of an old storage object, such as an old volume, is reassigned or reused in connection with a new storage object, such as a new volume. In at least one embodiment, the SOIDHT can be used to track all SOID reassignments or reuses that are in progress in that such SOIDs may potentially still have outstanding activity such as MD log updates pending for the old storage object, such as the old volume, even though the corresponding SOID has been reassigned or reused in connection with a new instance of a new storage object, such as the new volume. In at least one embodiment, the outstanding activity associated with a reused or reassigned SOID can include one or more MD page updates each denoting a SA statistic update for the old storage object instance, such as the old volume. In addition to tracking or recording the SOID that has been reassigned or reused, an embodiment can also track the current LSN at the time of SOID reassignment, where the tracked current LSN associated with the reassigned SOID can sometimes be referred to herein as the reassign LSN. In at least one embodiment, the techniques of the present disclosure can use the reassign LSN of a reassigned or reused SOID to identify and drop (e.g., skip or ignore) obsolete outstanding SA statistics updates recorded in the MD log for the old prior storage object instance corresponding to the reused or reassigned SOID.

In at least one embodiment, the reassign LSN associated with a reassigned or reused SOID can indicate that any recorded UD log entry UD1 having an associated LSN X1 that is less than the reassign LSN relates to the old or prior SO associated with the reused SOID, and any SA statistic update of the MD log that is associated with the recorded UD log entry UD1 is not relevant and can be ignored, skipped or dropped.

In at least one embodiment, each time an SOID is reused or reassigned, a corresponding SOIDHT entry can be recorded in the SOIDHT as noted above. Additionally, a corresponding dropinode SA delta, update or tuple can be added or recorded in the MD log. In at least one embodiment, the dropinode SA delta can include information identifying the reassign LSN and identifying the SOID corresponding to the SOIDHT entry added to the SOIDHT for the reassigned or reused SOID that is reassigned or reused at a point in time denoted by the reassign LSN of the SOIDHT entry.

Referring to FIG. 10, shown is an example 1000 illustrating fields that can be included in the dropinode SA delta in at least one embodiment in accordance with the techniques of the present disclosure In at least one embodiment, the dropinode SA delta can be a tuple as discussed elsewhere and can include the fields as identified in the example 1000. In at least one embodiment with reference to the example 1000 of FIG. 10, a dropinode SA delta 1010 denotes a marker of previously recorded SA statistic updates of the MD log to drop, skip or ignore, where the previously recorded SA statistic updates are associated with an SOID that has been reassigned and correspond to an old or prior SO instance previously but not currently assigned the SOID. A dropinode SA delta 1010 can be represented by a tuple including the following fields:

LI 1010a is a unique logical index of a MD page including SA statistics for the SOID that maps to the LI. In at least one embodiment, the SOID that maps to the LI 1010a can optionally be explicitly stored as a value in field 1010e discussed below, or otherwise determined by a mapping function from LI 1010a. LI 1010a maps to an SOID that has been reassigned or reused.

EI 1010b is an entry index denoting a particular entry, offset or location in the MD page denoted by LI 1010a. LI 1010a and EI 1010b collectively denote a MD page entry including one or more SA statistics maintained for the SOID that maps to LI 1010a, where the SOID can also be optionally stored as field 1010e.

T 1010c identifies that the type is Dropinode SA delta.

V 1010d is the reassign LSN denoting the point in time prior to which all MD log updates to SA statistics for the SOID 1010e mapped to the LI 1010a are dropped, skipped or ignored.

SOID (storage object ID) 1010e can be an optional field explicitly storing the SOID that maps to the LI 1010a.

In connection with a dropinode SA delta, the LI 101a can be mapped to the corresponding SOID 1010e such as using a first mapping function F1, and the SOID 1010e can be mapped to the corresponding LI 1010a such as using a second mapping function F2. The foregoing first and second mapping functions can be mathematical functions, where F1 (LI)=SOID, and where F2 (SOID)=LI.

Figure 11:
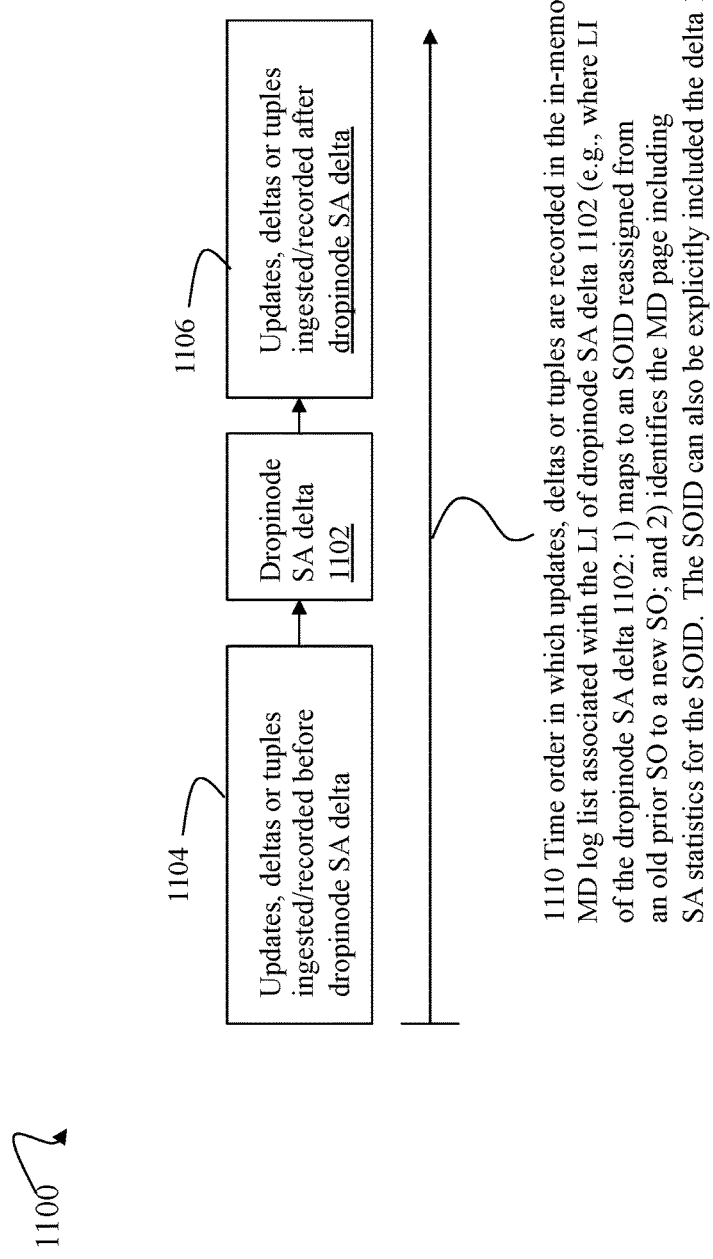

Referring to FIG. 11, shown is an example 1100 illustrating a list of updates, deltas or tuples in at least one embodiment in accordance with the techniques of the present disclosure.

The example 1100 can represent a list of MD updates recorded in the in-memory MD log on a list associated with an LI, such as LI 1010a of the dropinode SA delta 1102, of a MD page including SA statistics for a corresponding SOID 1010e of 1102. The dropinode SA delta 1102 can include fields as in the example 1000.

Element 1110 can denote a left to right increasing time order in which MD updates associated with an LI can be ingested or recorded in the list 1100. Element 1104 denotes one or more updates, deltas or tuples that are ingested or recorded in the MD log before the dropinode SA delta 1102. Element 1106 denotes one or more updates, deltas or tuples that are ingested or recorded in the MD log after the dropinode SA delta 1102. The list 1100 can be associated with an LI or logical index of a MD page including SA statistics for a corresponding SOID, where the LI and the SOID are identified using the delta 1102. In particular, the LI of 1102 maps to an SOID that has been reassigned from an old prior SO to a new SO. Additionally, the LI of 1102 identifies the MD page including SA statistics for the SOID of the delta 1102. Consistent with the example 1000, the SOID can be explicitly included in the field 1010e of the delta 1102.

When the MD log including the list 1100 of MD updates is destaged, any SA statistic updates included in 1104 (e.g., recorded prior in time before the delta 1102) that are for the SOID identified using the delta 1102 are skipped, ignored or dropped since such skipped SA statistic updates of 1104 correspond to the old SO previously but not currently assigned the SOID.

When the MD log including the list 1100 of MD updates is destaged, any SA statistic updates included in 1106 (e.g., recorded after in time subsequent to the delta 1102) that are for the SOID identified using the delta 1102 are applied to the MD page associated with the LI of the delta 1102 since such SA statistic updates of 1106 correspond to the new SO currently assigned the SOID.

In this manner in at least one embodiment, the delta 1102 serves as a marker of what SA statistics updates to ignore, and what SA statistics updates to apply to a corresponding MD page of SA statistics, where the MD page is identified using the LI of the delta 1102, and where the MD page of SA statistics is associated with the SOID as identified in the delta 1102. Alternatively, the associated SOID having its SA statistics stored in the MD page denoted by the LI of the delta 1102 can be determined by mapping the LI of the delta 1102 to the associated SOID.

Figure 12:
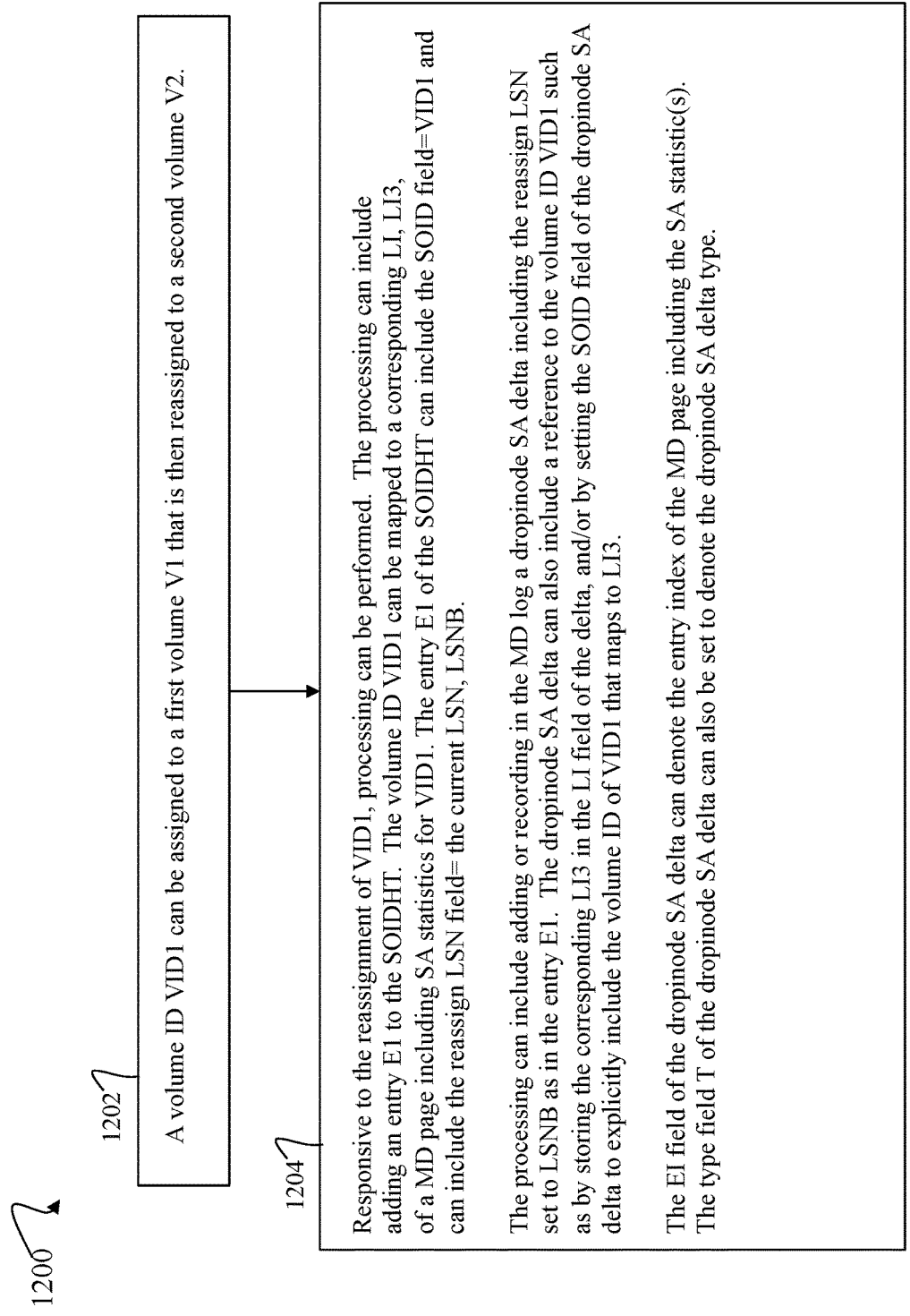
FIGS. 12, 13 and 14 are flowcharts of processing steps that can be performed in at least one embodiment in accordance with the techniques of the present disclosure.
Figure 13:
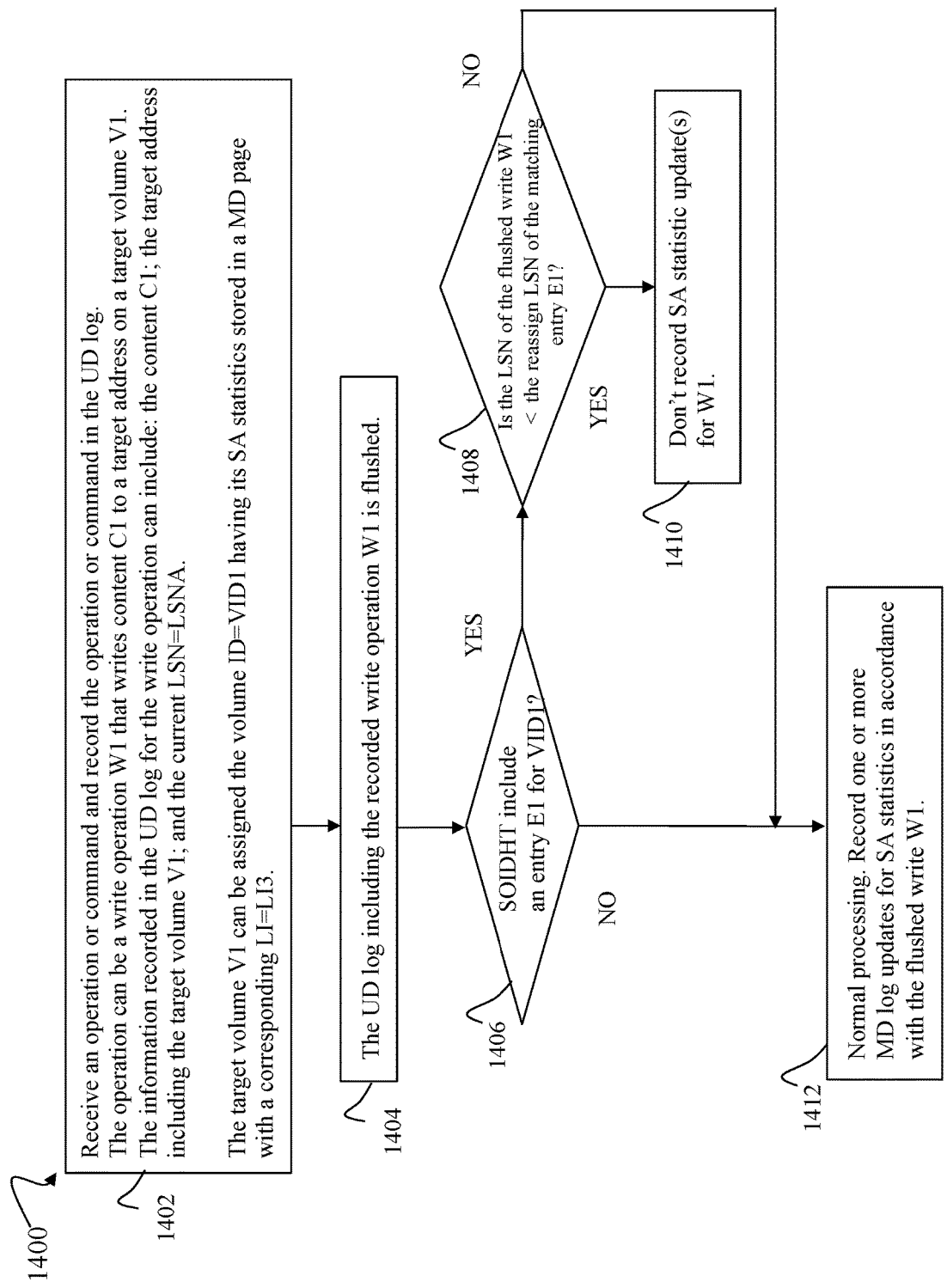
Figure 14:
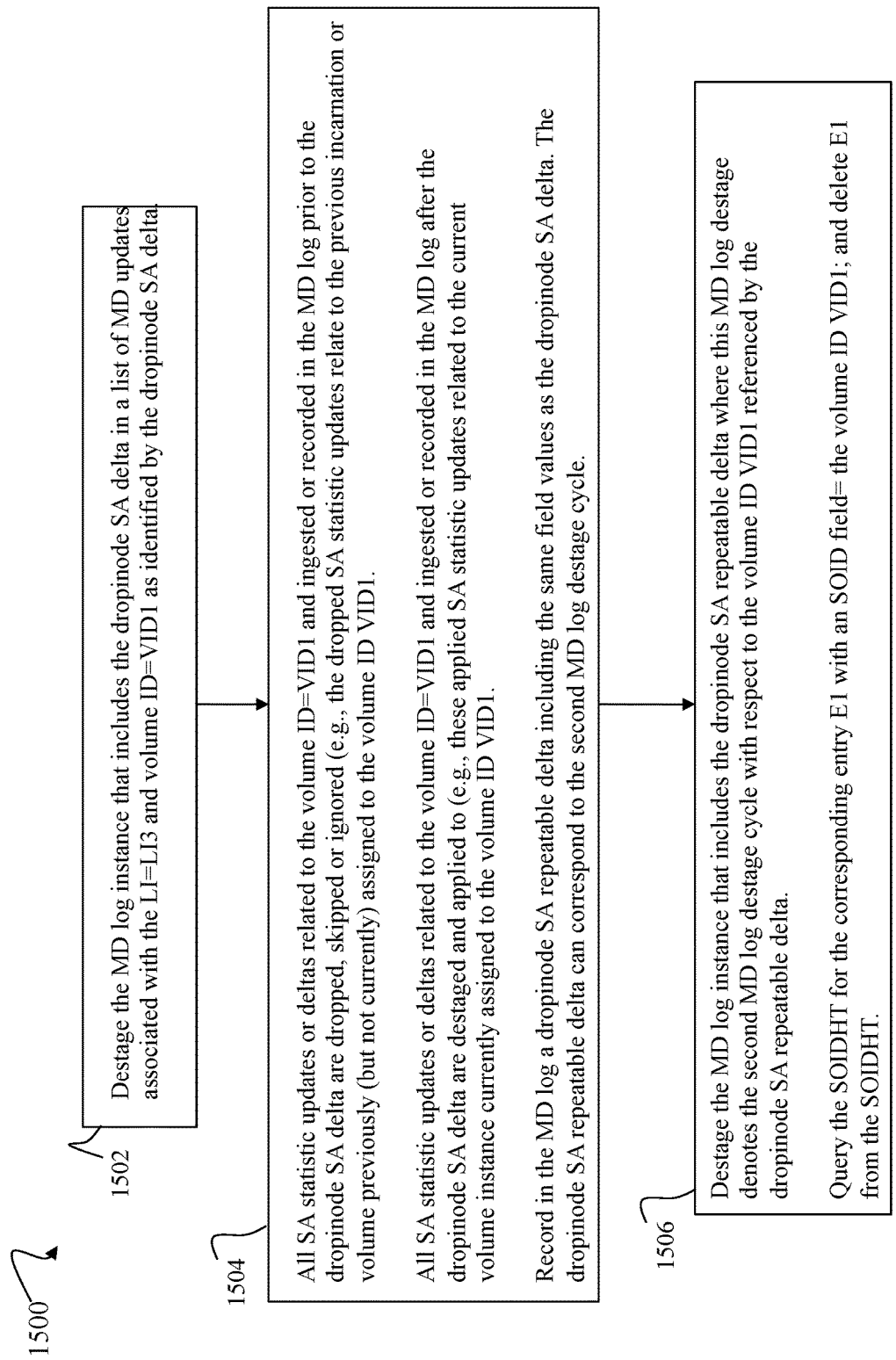

What will now be described with reference to FIGS. 12, 13 and 14 are flowcharts summarizing processing discussed above. The flowcharts below described processing in connection with a particular type of SO and SOID, where the SO is a volume and the SOID is thus a volume ID. More generally, such processing can be performed in connection with other types of supported SOs in an embodiment.

Referring to FIG. 12, shown is a flowchart 1200 of processing steps that can be performed in at least one embodiment in accordance with the techniques of the present disclosure. The steps of 1200 can be performed in connection with reassignment or reuse of a volume ID.

At the step 1202, a volume ID VID1 can be assigned to a first volume V1 that is then reassigned to a second volume V2. From the step 1202, control proceeds to the step 1204.

At the step 1204, responsive to the reassignment of VID1, processing can be performed. The processing of the step 1204 can include adding a new entry E1 to the SOIDHT. The volume ID VID1 can be mapped to a corresponding LI, LI3, of a MD page including SA statistics for the volume ID VID1. The entry E1 of the SOIDHT can include the SOID field=VID1 and can include the reassign LSN field=the current LSN, LSNB.

The processing of the step 1204 can include adding or recording in the MD log a dropinode SA delta including the reassign LSN field set to LSNB as in the entry E1 of the SOIDHT. The dropinode SA delta can also include a reference to the volume ID VID1 such as by storing the corresponding LI3 in the LI field of the delta, and/or by setting the SOID field of the dropinode SA delta to explicitly include the volume ID of VID1 that maps to LI3. The EI field of the dropinode SA delta can denote the entry index of the MD page including the SA statistic(s). The type field T of the dropinode SA delta can also be set to denote the dropinode SA delta type.

Referring to FIG. 13, shown is a flowchart 1400 of processing steps that can be performed in at least one embodiment in accordance with the techniques of the present disclosure. The steps of 1400 can be performed in connection with write operation processing. More generally, the steps of 1400 can be extended for use in connection with other supported operations or commands, some of which are noted herein, that can result in updating one or more SA statistics associated with a corresponding storage object.

At the step 1402, an operation or command is received and recorded in the UD log The operation can be a write operation W1 that writes content C1 to a target address on a target volume V1. The information recorded in the UD log for the write operation can include: the content C1; the target address including the target volume V1; and the current LSN=LSNA. The target volume V1 can be assigned the volume ID=VID1 having its SA statistics stored in a MD page with a corresponding LI=LI3. From the step 1402, control proceeds to the step 1404.

At the step 1404, the UD log including the write operation W1 is flushed. From the step 1404, control proceeds to step 1406 to commence processing of the flushed write operation W1.

At the step 1406, a determination is made as to whether the SOIDHT includes an entry E1 for the volume ID VID1. The step 1406 can include querying the SOIDHT using the volume ID VID1 and determining whether the SOIDHT includes a matching entry E1 with an SOID field matching the volume ID, VID1. If the step 1406 evaluates to yes where such an entry E1 is located in the SOIDHT, control proceeds to the step 1408.

At the step 1408, a determination is made as to whether the LSN of the flushed write W1 is less than the value of the reassign LSN field of the matching entry E1 of the SOIDTHT. If the step 1408 evaluates to no, control proceeds to the step 1412. Otherwise if the step 1408 evaluates to yes, control proceeds to the step 1410. At the step 1410, no SA statistic updates are recorded in the MD log for W1 directed to the target volume V1.

If the step 1406 evaluates to no, control proceeds to the step 1412. At the step 1412, normal processing is performed for the flushed write W1 directed to the target volume V1. Such normal processing can include recording one or more MD log updates for SA statistics in accordance with the flushed write W1.

Referring to FIG. 14, shown is a flowchart 1500 of processing steps that can be performed in at least one embodiment in accordance with the techniques of the present disclosure. The steps of 1500 can be performed in connection with MD log destaging.

At the step 1502, the MD log instance can be destaged that includes the dropinode SA delta in a list of MD updates associated with LI=LI3 and the volume ID=VID1 as identified in the dropinode SA delta. The dropinode SA delta included in the MD log instance can be added in the step 1204 of FIG. 12. From the step 1502, control proceeds to the step 1504.

At the step 1504, all SA statistic updates or deltas that are related to the volume ID=VID1 and that are ingested or recorded in the MD log prior to the dropinode SA delta are dropped, skipped or ignored (e.g., the dropped SA statistic updates relate to the previous incarnation or volume previously (but not currently) assigned to the volume ID VID1.

Also in the step 1504, all SA statistic updates or deltas that are related to the volume ID=VID1 and that are ingested or recorded in the MD log after the dropinode SA delta are destaged and applied to (e.g., these applied SA statistic updates related to the current volume instance currently assigned to the volume ID VID1.

Additionally, processing in the step 1504 can include recording in the MD log a dropinode SA repeatable delta including the same field values as the dropinode SA delta. The dropinode SA repeatable delta can correspond to or be used to identify the occurrence of the second MD log destage cycle (relative to the time period during which outstanding activity, including SA statistics updates, can be cleaned or drained from the system. From the step 1504, control proceeds to the step 1506.

At the step 1506, processing can be performed to destage the MD log instances that includes the dropinode SA repeatable delta where this MD log destage denotes the second MD log destage cycle with respect to the volume ID VID1 referenced by the dropinode SA repeatable delta.

Processing of the step 1506 can include querying the SOIDHT for the corresponding entry E1 with an SOID field=the volume ID VID1; and deleting E1 from the SOIDHT.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
   maintaining a storage object identifier hash table (SOIDHT) that tracks storage object identifiers (IDs) that have been reassigned among storage objects and that have potential outstanding activity associated with storage objects as prior to performing corresponding reassignments, wherein the SOIDHT is indexed by storage object IDs mapped to corresponding entries each including a storage object ID and a corresponding logical sequence number (LSN) denoting a point in time when the storage object ID was reassigned from one storage object to another storage object;
   receiving, from a host, a first operation directed to a first storage object assigned a first storage object ID;
   recording, in a user data (UD) log, a first UD log entry corresponding to the first operation, wherein the first UD log entry includes a first LSN denoting a point in time when the first operation is recorded in the UD log; and
   flushing the UD log including the first UD log entry, where said flushing includes:
      querying the SOIDHT to determine whether the first storage object ID has a corresponding first entry included in the SOIDHT; and
      responsive to determining that the first storage object has a corresponding first entry included in the SOIDHT, performing first processing including:
         determining whether the first LSN of the first UD log entry of the first operation is less than a second LSN of the corresponding first entry of the SOIDHT; and
         responsive to determining that the first LSN of the first UD log entry of the first operation is less than the second LSN of the corresponding first entry of the SOIDHT, not recording any update in a metadata (MD) log to one or more first space accounting (SA) statistics, and otherwise recording a first set of one or more updates to one or more first SA statistics in the MD log, where each update of the first set is in accordance with storage consumption changes due to the first operation recorded in the first UD log entry.

2. The computer-implemented method of claim 1, wherein said flushing the UD log includes:
   responsive to determining that the first storage object does not have a corresponding first entry included in the SOIDHT, recording a second set of one or more updates to one or more first SA statistics in the MD log, where each update of the second set is in accordance with storage consumption changes due to the first operation recorded in the first UD log entry.

3. The computer-implemented method of claim 1, further comprising:
reassigning the first storage object ID from a second storage object to the first storage object; and
responsive to said reassigning, performing second processing including:
adding the first corresponding entry to the SOIDHT, wherein the first corresponding entry includes the second LSN denoting a point in time when said reassigning the first storage object ID is performed.

4. The computer-implemented method of claim 3, wherein the second processing includes:
recording in the MD log a drop SA delta that indicates to drop or ignore SA accounting updates of the first storage object ID that are recorded in the MD log prior to the drop SA delta, wherein the drop SA delta includes the second LSN denoting a point in time when said reassigning the first storage object ID is performed.

5. The computer-implemented method of claim 4, further comprising:
destaging the MD log including the drop SA delta that indicates to drop or ignore SA accounting updates of the first storage object ID and that includes the second LSN denoting a point in time when said reassigning the first storage object ID is performed.

6. The computer-implemented method of claim 5, wherein said destaging the MD log includes:
dropping or skipping a first portion of updates to SA statistics that are related to the first storage object ID and that are ingested or recorded in the MD log prior to the drop SA delta.

7. The computer-implemented method of claim 6, wherein the first portion of updates to SA statistics are associated with the second storage object previously assigned to the first storage object ID but not currently assigned to the first storage object ID.

8. The computer-implemented method of claim 6, wherein said destaging the MD log includes:
applying a second portion of updates to SA statistics that are related to the first storage object ID and that are ingested or recorded in the MD log after the drop SA delta.

9. The computer-implemented method of claim 8, wherein the second portion of updates to SA statistics are associated with the first storage object currently assigned to the first storage object ID.

10. The computer-implemented method of claim 5, further comprising:
responsive to detecting the drop SA delta, recording in the MD log a drop SA repeatable delta that marks a second MD log destage cycle of MD log updates to SA statistics for the first storage object ID, wherein the drop SA repeatable delta includes the second LSN denoting a point in time when said reassigning the first storage object ID is performed.

11. The computer-implemented method of claim 10, wherein said destaging the MD log including the drop SA delta destages a first instance of a MD log, and wherein the MD log including the drop SA repeatable delta is a second instance of the MD log.

12. The computer-implemented method of claim 11, further comprising:
destaging the second instance of the MD log including the drop SA repeatable delta that marks the second MD log destage cycle of MD log updates to SA statistics for the first storage object ID.

13. The computer-implemented method of claim 12, wherein said destaging the second instance of the MD log includes:
responsive to detecting the drop SA repeatable delta, deleting the first corresponding entry from the SOIDHT, wherein the first corresponding entry references the first storage object ID and includes the second LSN denoting a point in time when said reassigning the first storage object ID is performed.

14. The computer-implemented method of claim 1, wherein the first storage object and each storage object having a corresponding entry in the SOIDHT is one type of a set of defined object types.

15. The computer-implemented method of claim 14, wherein the set of defined object types includes any of: a volume or logical device, a file system, a file, a snapshot of a storage object, and a directory.

16. The computer-implemented method of claim 1, wherein the first operation is a write operation that writes content to the first storage object resulting in increasing an amount of storage consumed for storing content of the first storage object.

17. The computer-implemented method of claim 1, wherein the first operation deletes at least some of the content of the first storage object resulting in decreasing an amount of storage consumed for storing content of the first storage object.

18. The computer-implemented method of claim 1, wherein the first operation changes an amount of storage consumed for storing content of the first storage object.

19. A system comprising:
one or more processors; and
a memory comprising code stored thereon that, when executed, performs a method comprising:
maintaining a storage object identifier hash table (SOIDHT) that tracks storage object identifiers (IDs) that have been reassigned among storage objects and that have potential outstanding activity associated with storage objects as prior to performing corresponding reassignments, wherein the SOIDHT is indexed by storage object IDs mapped to corresponding entries each including a storage object ID and a corresponding logical sequence number (LSN) denoting a point in time when the storage object ID was reassigned from one storage object to another storage object;
receiving, from a host, a first operation directed to a first storage object assigned a first storage object ID;
recording, in a user data (UD) log, a first UD log entry corresponding to the first operation, wherein the first UD log entry includes a first LSN denoting a point in time when the first operation is recorded in the UD log; and
flushing the UD log including the first UD log entry, where said flushing includes:
querying the SOIDHT to determine whether the first storage object ID has a corresponding first entry included in the SOIDHT; and
responsive to determining that the first storage object has a corresponding first entry included in the SOIDHT, performing first processing including:
determining whether the first LSN of the first UD log entry of the first operation is less than a second LSN of the corresponding first entry of the SOIDHT; and
responsive to determining that the first LSN of the first UD log entry of the first operation is less than the second LSN of the corresponding first entry of the SOIDHT, not recording any update in a metadata (MD) log to one or more first space accounting (SA) statistics, and otherwise recording a first set of one or more updates to one or more first SA statistics in the MD log, where each update of the first set is in accordance with storage consumption changes due to the first operation recorded in the first UD log entry.

20. A non-transitory computer readable medium comprising code stored thereon that, when executed, performs a method comprising:

maintaining a storage object identifier hash table (SOIDHT) that tracks storage object identifiers (IDs) that have been reassigned among storage objects and that have potential outstanding activity associated with storage objects as prior to performing corresponding reassignments, wherein the SOIDHT is indexed by storage object IDs mapped to corresponding entries each including a storage object ID and a corresponding logical sequence number (LSN) denoting a point in time when the storage object ID was reassigned from one storage object to another storage object;

receiving, from a host, a first operation directed to a first storage object assigned a first storage object ID;

recording, in a user data (UD) log, a first UD log entry corresponding to the first operation, wherein the first UD log entry includes a first LSN denoting a point in time when the first operation is recorded in the UD log; and flushing the UD log including the first UD log entry, where said flushing includes:

querying the SOIDHT to determine whether the first storage object ID has a corresponding first entry included in the SOIDHT; and responsive to determining that the first storage object has a corresponding first entry included in the SOIDHT, performing first processing including:

determining whether the first LSN of the first UD log entry of the first operation is less than a second LSN of the corresponding first entry of the SOIDHT; and responsive to determining that the first LSN of the first UD log entry of the first operation is less than the second LSN of the corresponding first entry of the SOIDHT, not recording any update in a metadata (MD) log to one or more first space accounting (SA) statistics, and otherwise recording a first set of one or more updates to one or more first SA statistics in the MD log, where each update of the first set is in accordance with storage consumption changes due to the first operation recorded in the first UD log entry.

* * * * *